United States Patent

Naganuma et al.

[11] Patent Number: 6,115,178
[45] Date of Patent: *Sep. 5, 2000

[54] OPTICAL DEVICE

[75] Inventors: Norihisa Naganuma; Teruhiro Kubo, both of Sapporo, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/608,127

[22] Filed: Feb. 28, 1996

[51] Int. Cl.$^7$ ................................... G02B 5/30
[52] U.S. Cl. ................... 359/495; 359/496; 359/583; 359/629; 359/634; 359/636; 359/638; 359/834
[58] Field of Search .......................... 359/487, 494, 359/495, 496, 583, 629, 633, 634, 636, 638, 639, 640, 833, 834, 835, 836, 837, 839, 129, 122; 385/36; 372/100, 105

[56] References Cited

U.S. PATENT DOCUMENTS

| | | | |
|---|---|---|---|
| 3,443,871 | 5/1969 | Chitayat | 359/629 |
| 3,498,693 | 3/1970 | Fein et al. | 359/857 |
| 3,675,985 | 7/1972 | Gloge | 359/496 |
| 3,844,638 | 10/1974 | Lingenfelder et al. . | |
| 4,093,354 | 6/1978 | Leeb | 359/834 |
| 4,500,181 | 2/1985 | Takahashi | 359/833 |
| 4,502,757 | 3/1985 | Maeda | 359/629 |
| 4,504,123 | 3/1985 | Smith | 359/629 |
| 4,660,932 | 4/1987 | Eckbreth | 359/629 |
| 4,707,064 | 11/1987 | Dobrowolski et al. . | |
| 4,765,715 | 8/1988 | Matsudaira et al. | 359/583 |
| 5,005,935 | 4/1991 | Kunikane et al. . | |
| 5,125,053 | 6/1992 | Abe et al. | 385/36 |
| 5,583,683 | 12/1996 | Scobey | 359/589 |

FOREIGN PATENT DOCUMENTS

| | | | |
|---|---|---|---|
| 0022022 | 2/1984 | Japan | 359/636 |
| 1397404 | 6/1975 | United Kingdom . | |
| 2149933 | 6/1995 | United Kingdom . | |

*Primary Examiner*—Ricky P. Shafer
*Attorney, Agent, or Firm*—Helfgott & Karas, P.C.

[57] ABSTRACT

The invention provides an optical device suitable for use with an optical amplifier, for example, in an optical communication system and advantageous in that different functions of a plurality of optical elements are achieved using an optical element of a simple construction and the optical device can be produced in a reduced size at a reduced cost. The optical device includes a tapered prism constructed such that a first face and a second face thereof opposing to each other do not extend in parallel to each other. A dielectric multi-layer film is formed on the first face of the tapered prism positioned on an optical signal inputting side. A reflection film is formed on the second face for reflecting the optical signal inputted to the tapered prism through the first face at least once toward the first face. A non-reflection film is formed on one of the first face, the second face and the other face or faces of the tapered prism for extracting therethrough the optical signal inputted to and reflected in the tapered prism.

16 Claims, 26 Drawing Sheets

F I G. 12
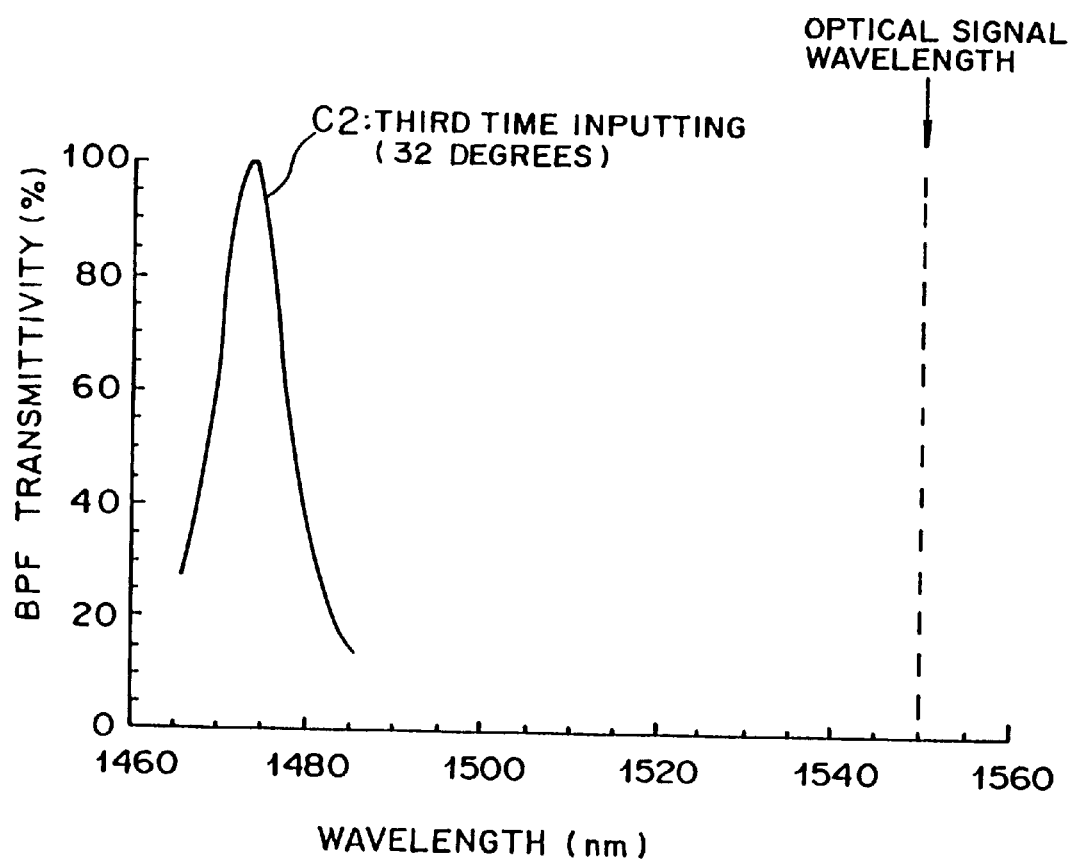

OPTICAL DEVICE

BACKGROUND OF THE INVENTION

1. Field of the Invention

This invention relates to an optical device suitable for use with an optical amplifier, for example, of an optical communication system.

2. Description of the Related Art

In optical communications, an erbium-doped optical fiber amplifier which operates with a lowest loss wavelength (1.55 μm) of an optical fiber of quartz is usually used as measures for solving the problem of the limitation to the loss of a transmission system and assuring a large amount of information.

FIG. 25 is a block diagram showing a construction of an erbium doped optical fiber amplifier 100 of the type described above. Referring to FIG. 25, the erbium doped optical fiber amplifier 100 shown includes an erbium doped fiber 102 for amplifying an optical signal, a front optical circuit 101 provided at a preceding stage to the erbium doped fiber 102, and a rear optical circuit 103 provided at a following stage to the erbium doped fiber 102.

The front optical circuit 101 includes a coupler (CPL) 101A, a photodiode (PD) 101B and an isolator (ISO) 101C. The photodiode 101B monitors an input optical signal to the front optical circuit 101 through the coupler 101A, and the isolator 101C prevents the resonance by reflection of light amplified by the erbium doped fiber 102. An output optical signal of the isolator 101C is inputted to the erbium doped fiber 102.

The rear optical circuit 103 includes an optical wave multiplexing-demultiplexing coupler (WDM coupler) 103A, a polarized light separator (PBS) 103B, a total reflection optical film (HR) 103C, an isolator (ISO) 103D, a pair of couplers (CPL) 103E and 103G, and a pair of photodiodes (PD) 103F and 103H. pump light inputted from a pair of laser diodes (LD) 107 and 108 is supplied through the WDM coupler 103A to the erbium doped fiber 102. On the other hand, an optical signal amplified by the erbium doped fiber 102 can be monitored by the photodiodes 103F and 103H. The isolator 103D prevents the resonance by reflection of light amplified by the erbium doped fiber 102 similarly to the isolator 101C.

The erbium doped optical fiber amplifier 100 further includes an alarm-monitor detection circuit 104, an automatic level controller (ATC circuit) 105, and an automatic level controller (ALC circuit) 106.

In the erbium doped optical fiber amplifier 100 shown in FIG. 25 and having the construction described above, an optical signal is amplified by the erbium doped fiber 102. In this instance, the input light is monitored by the photodiode 101B of the front optical circuit 101, and the amplified light is monitored by the photodiodes 103F and 103H of the rear optical circuit 103. In response to results of the monitoring, optical amplification control by the alarm-monitor detection circuit 104, the ATC circuit 105 and the ALC circuit 106 is performed.

By the way, in the erbium doped optical fiber amplifier 100 described above, a large number of optical elements or devices such as an input light level monitor, an output light level monitor, a pumping optical wave multiplexer and a spontaneous emission light removing band-pass filter (not shown) are required at the preceding and following stages to the erbium doped fiber 102. Further, in the erbium doped optical fiber amplifier 100, those optical devices are individually connected in multiple connection. Where such optical devices are individually connected in multiple connection in this manner, there is a subject to be solved in that a large mounting space and a great number of steps of fiber connecting operations are required. It is another subject to be solved that, since the individual optical devices are expensive, it is difficult to achieve miniaturization and reduction in cost of the product.

FIG. 26 is a block diagram showing a construction of an improved rear optical circuit 203 having a similar function to that of the rear optical circuit 103 of the erbium doped optical fiber amplifier 100. Referring to FIG. 26, the rear optical circuit 203 includes a plurality of dielectric multi-layer films interposed in a collimate beam system based on a single lens system so that it has a plurality of functions. Where the rear optical circuit 203 is incorporated in the erbium doped optical fiber amplifier 100, the mounting space and the number of steps of fiber connecting operations can be reduced.

It is to be noted that the rear optical circuit 203 shown in FIG. 26 includes an optical wave multiplexing coupler (WDM coupler) 203A, a polarized light separator (PBS) 203B, a pair of total reflection optical films (HR) 203C and 203G, an isolator (ISO) 203D, a coupler (CPL) 203E, and a pair of photodiodes (PD) 203F and 203H.

However, since the dielectric multi-layer film used to form the rear optical circuit 203 is expensive and the rear optical circuit 203 requires a plurality of such rear optical circuit 203, there is a subject to be solved that it is difficult to reduce the cost of the rear optical circuit 203.

SUMMARY OF THE INVENTION

It is an object of the present invention to provide an optical device wherein an optical device usually constructed using a plurality of optical elements or a plurality of optical films is constructed using a single optical element of a simple construction to reduce the number of steps of connection operations of fibers and reduce the size and the required cost.

In order to attain the object described above, according to the present invention, there is provided an optical device, comprising a tapered prism constructed such that a first face and a second face thereof opposing to each other do not extend in parallel to each other, a dielectric multi-layer film formed on the first face of the tapered prism which is positioned on a side of the tapered prism to which an optical signal is inputted, a reflection film formed on the second face for reflecting the optical signal inputted to the tapered prism through the first face at least once toward the first face, and a non-reflection film formed on one of the first face, the second face and the other face or faces of the tapered prism for extracting therethrough the optical signal inputted to and reflected in the tapered prism.

With the optical device, operations which are usually performed by a plurality of optical films can be realized using a single dielectric multi-layer film. Consequently, the optical device is advantageous in that it can be produced with a comparatively small size and at a comparatively low cost.

According to another aspect of the present invention, there is provided an optical device, comprising a first parallel flat plate transparent member positioned on an input side to which an optical signal is inputted, a second parallel flat plate transparent member disposed in an opposing relationship to the first parallel flat plate transparent member but not in parallel to the first parallel flat plate transparent member, a dielectric multi-layer film formed on the first parallel flat plate transparent member, a reflection film formed on the second parallel flat plate transparent member for reflecting the optical signal inputted through the first parallel flat plate transparent member at least once toward the first parallel flat plate transparent member, and an optical signal extraction section for extracting the inputted and reflected optical signal therethrough.

Also with the optical device, operations which are usually performed by a plurality of optical films can be realized using a single dielectric multi-layer film. Consequently, the optical device is advantageous in that it can be produced with a comparatively small size and at a comparatively low cost.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIGS. 10 to 12 are diagrams illustrating different wavelength characteristics of a band-pass filter as a dielectric multi-layer film;

DESCRIPTION OF THE PREFERRED EMBODIMENTS a. Aspects of the Invention

Figure 1:
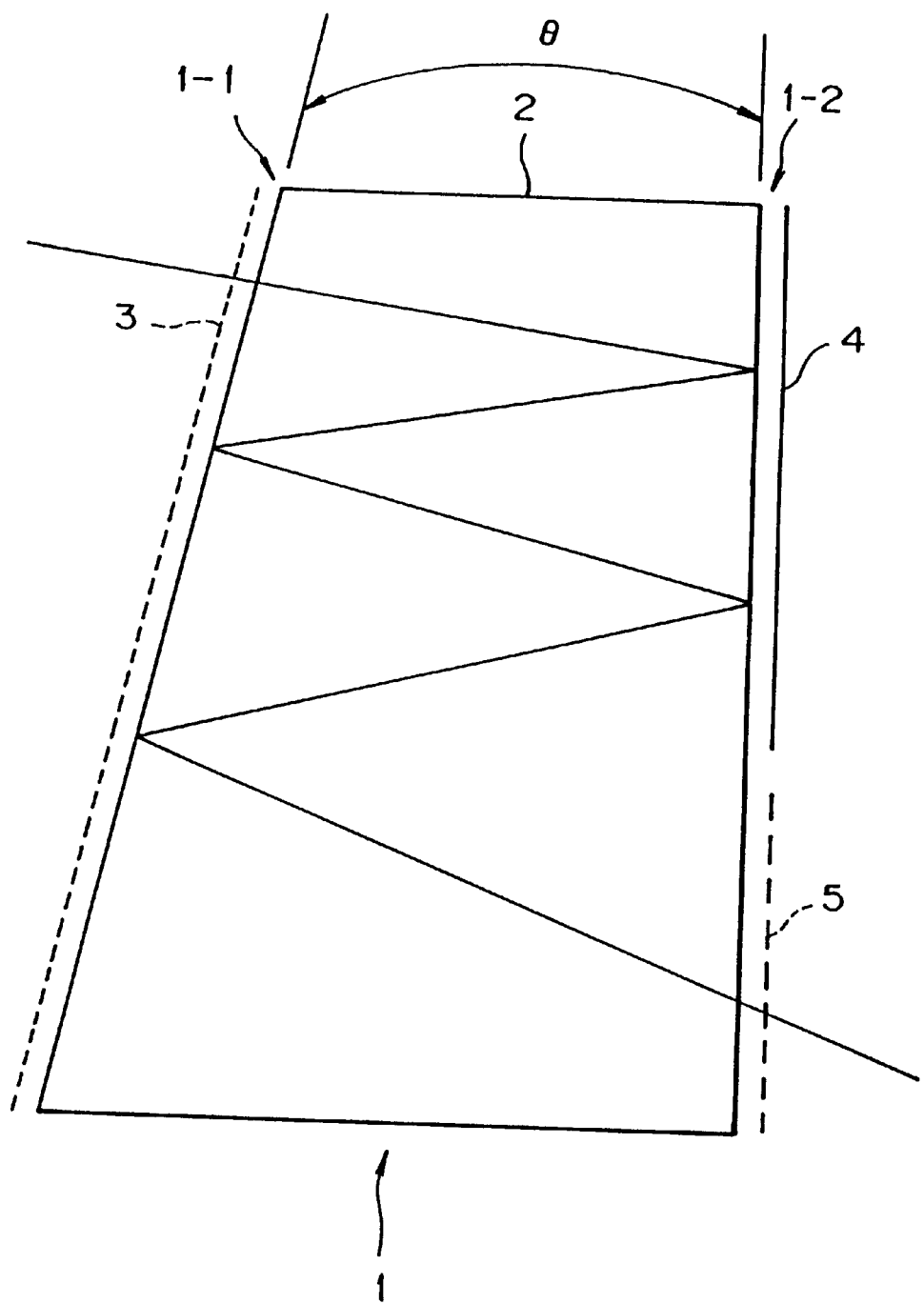
FIGS. 1 and 2 are schematic views showing different aspects of the present invention.

Referring first to FIG. 1, there is shown an optical device according to an aspect of the present invention. The optical device is generally denoted at 1 and includes a tapered prism 2 constructed such that a first face 1-1 and a second face 1-2 thereof opposing to each other do not extend in parallel to each other but define an included angle (apex angle) of $\theta$ therebetween. A dielectric multi-layer film 3 is formed on the first face 1-1 of the tapered prism 2 which is positioned on a side of the tapered prism 2 to which an optical signal is inputted while a reflection film 4 is formed on the second face 1-2 for reflecting the optical signal inputted to the tapered prism 2 through the first face 1-1 at least once toward the first face 1-1. Further, a non-reflection film 5 is formed on one of the first face 1-1, the second face 1-2 and the other face or faces of the tapered prism 2 for extracting therethrough the optical signal inputted to and reflected in the tapered prism 2.

The tapered prism 2 may be formed from a double refraction material so as to set a particular optical path for particular polarized light. Or, the tapered prism 2 may be formed as a polygonal prism the first face 1-1 of which includes a plurality of different inclined faces so that the variation of the incident angle of the optical signal is controlled positively.

Or else, a non-reflection film for inputting another optical signal therethrough to a point of the first face 1-1 through which the first-mentioned optical signal is inputted may be formed at a portion of the second face 1-2 so as to set a reflection optical path for the optical signal inputted through the first face 1-1.

The non-reflection film 5 for extracting therethrough the optical signal inputted to and reflected in the tapered prism 2 may be formed at a portion of the second face 1-2. The non-reflection film 5 may be disposed perpendicularly to a path along which the optical signal is outputted from the tapered prism 2 so that the variation in the direction of the optical path when the optical signal is outputted may be suppressed.

The optical device 1 may further include a tapered prism tilting mechanism for tilting the entire tapered prism 2 so as to control the delicate wavelength characteristic of the optical signal.

In the optical device 1 shown in FIG. 1 and having the construction described above, an optical signal inputted to the optical device 1 through the first face 1-1 is reflected for the first time by the the second face 1-2 and then inputted for the second time to the first face 1-1. Then, the optical signal is reflected by the first face 1-1 and then reflected for the second time by the second face 1-2, whereafter it is inputted for the third time to the first face 1-1. Finally, the optical signal is reflected by the first face 1-1 and then outputted from the optical device 1 through the second face 1-2.

In this manner, with the optical device 1, by its simple construction that the first face 1-1 and the second face 1-2 opposing to each other do not extend in parallel to each other and the dielectric multi-layer film 3 is formed on the first face 1-1 while the reflection film 4 is formed on the second face 1-2 and the non-reflection film 5 is formed on one of the first face 1-1, the second face 1-2 and the other face or faces of the tapered prism 2, operations which are usually performed by a plurality of optical films can be realized using the single dielectric multi-layer film 3. Consequently, the optical device 1 is advantageous in that it can be produced with a comparatively small size and at a comparatively low cost.

Where the tapered prism 2 is formed from a double refraction material, a particular optical path for particularly polarized light can be set. Further, where the tapered prism 2 is formed as a polygonal prism the first face 1-1 of which includes a plurality of different inclined faces, the variation of the incident angle of the optical signal can be controlled positively. Consequently, the optical device 1 is advantageous in that it can be formed with various characteristics.

Where the non-reflection film for inputting another optical signal therethrough to a point of the first face 1-1 through which the first-mentioned optical signal is inputted is formed at a portion of the second face 1-2, the optical device 1 is advantageous in that it can be applied to a wavelength multiplexing communication system in optical communication.

Where the non-reflection film 5 for extracting therethrough the optical signal inputted to and reflected in the tapered prism 2 is formed at a portion of the second face 1-2 or disposed perpendicularly to a path along which the optical signal is outputted from the tapered prism 2, the optical device 1 is advantageous in that the direction of the optical path when the optical signal is outputted can be controlled.

Where the optical device 1 further includes a tapered prism tilting mechanism for tilting the entire tapered prism 2, it is advantageous in that the delicate wavelength characteristic of the optical signal can be controlled.

Figure 2:
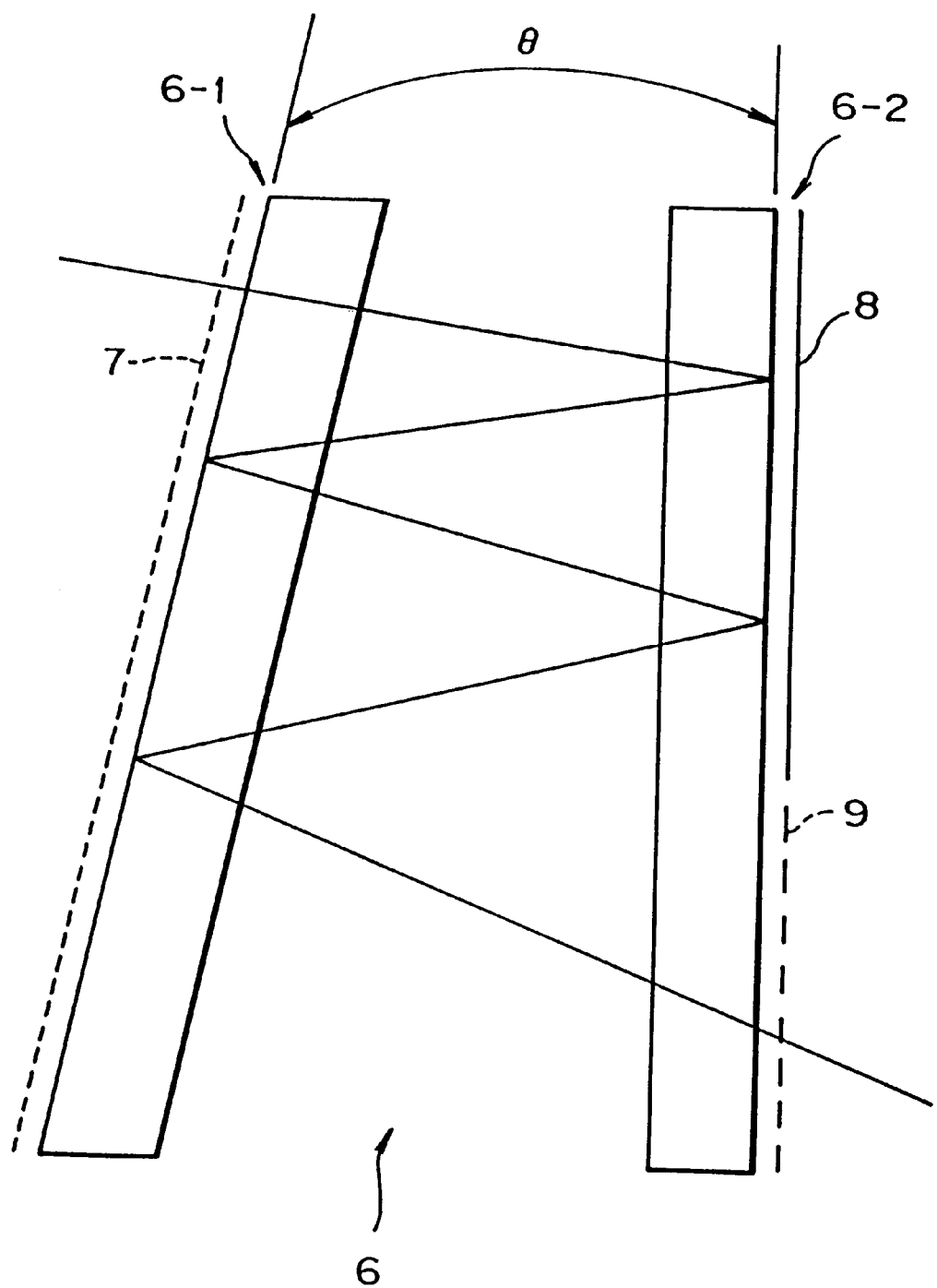

Referring now to FIG. 2, there is shown an optical device according to another aspect of the present invention. The optical device is generally denoted at 6 and includes a first parallel flat plate transparent member 6-1 positioned on an input side to which an optical signal is inputted, and a second parallel flat plate transparent member 6-2 disposed in an opposing relationship to the first parallel flat plate transparent member 6-1 but not in parallel to the first parallel flat plate transparent member 6-1 such that it defines an included angle (apex angle) of $\theta$ therebetween. A dielectric multi-layer film 7 is formed on the first parallel flat plate transparent member 6-1 while a reflection film 8 for reflecting the optical signal inputted through the first parallel flat plate transparent member 6-1 at least once toward the first parallel flat plate transparent member 6-1 is formed on the second parallel flat plate transparent member 6-2, and an optical signal extraction section 9 for extracting the inputted and reflected optical signal therethrough is provided.

The first parallel flat plate transparent member 6-1 may be formed from a plurality of parallel flat plate transparent members having different inclination angles so as to positively control the variation of the input angle.

An optical signal inputting section for admitting a second optical signal toward a point of the first parallel flat plate transparent member 6-1 through which the first-mentioned optical signal is inputted may be provided at a location spaced away from the second parallel flat plate transparent member 6-2, or a non-reflection film may be formed at a portion of the second parallel flat plate transparent member 6-2 as an optical signal inputting section so that the reflection optical path for the optical signal inputted through the first parallel flat plate transparent member 6-1 may be set.

The optical device 6 may further include a parallel flat plate transparent member tilting mechanism for tilting one of the first parallel flat plate transparent member 6-1 and the second parallel flat plate transparent member 6-2 so as to control the delicate wavelength characteristic of the optical signal.

In order to extract the optical signal inputted to and reflected in the optical device 6, the optical signal extraction section 9 may be provided at a location spaced away from the second parallel flat plate transparent member 6-2, or a non-reflection film may be formed at a portion of the second parallel flat plate transparent member 6-2 as the optical signal extraction section 9.

The optical device may further include an optical fiber with a lens for inputting the optical signal therethrough so as to assure a good collecting property for the optical signal. In this instance, the optical fiber with a lens for inputting the optical signal may be formed as a polarization plane keeping fiber so that a particular polarization component of the optical signal may be transmitted therethrough.

In the optical device shown in FIG. 2 and having the construction described above, an optical signal inputted through the first parallel flat plate transparent member 6-1 is reflected for the first time by the second parallel flat plate transparent member 6-2 and then inputted for the second time to the first parallel flat plate transparent member 6-1. Then, the optical signal is reflected by the first parallel flat plate transparent member 6-1 and then reflected for the second time by the second parallel flat plate transparent member 6-2, whereafter it is inputted for the third time to the first parallel flat plate transparent member 6-1. Finally, the optical signal is reflected by the first parallel flat plate transparent member 6-1 and then outputted through the second parallel flat plate transparent member 6-2.

In this manner, with the optical device 6, by its simple construction that it includes the first parallel flat plate transparent member 6-1 and the second parallel flat plate transparent member 6-2 disposed in an opposing relationship to the first parallel flat plate transparent member 6-1 but not in parallel to the first parallel flat plate transparent member 6-1 and the dielectric multi-layer film 7 is formed on the first parallel flat plate transparent member 6-1 while the reflection film 8 is formed on the second parallel flat plate transparent member 6-2 and the optical signal extraction section 9 for extracting the inputted and reflected optical signal therethrough is provided, operations which are usually performed by a plurality of optical films can be realized using the single dielectric multi-layer film 7. Consequently, the optical device 6 is advantageous in that it can be produced with a comparatively small size and at a comparatively low cost.

Where the first parallel flat plate transparent member 6-1 is formed from a plurality of parallel flat plate transparent members having different inclination angles, the optical device 1 is advantageous in that the variation of the input angle can be controlled positively and the optical device 6 can be formed with various characteristics.

Where an optical signal inputting section for admitting a second optical signal toward a point of the first parallel flat plate transparent member 6-1 through which the first-mentioned optical signal is inputted is provided at a location spaced away from the second parallel flat plate transparent member 6-2, or a non-reflection film is formed at a portion of the second parallel flat plate transparent member 6-2 as such optical signal inputting section, the optical device 6 is advantageous in that the reflection optical path for the optical signal inputted through the first parallel flat plate transparent member 6-1 can be set.

Where the optical device 6 further includes a parallel flat plate transparent member tilting mechanism for tilting one of the first parallel flat plate transparent member 6-1 and the second parallel flat plate transparent member 6-2, the optical device 6 is advantageous in that the delicate wavelength characteristic of the optical signal can be controlled.

While the optical signal extraction section 9 may be a non-reflection film formed at a portion of the second parallel flat plate transparent member 6-2, where it is provided at a location spaced away from the second parallel flat plate transparent member 6-2, the optical device 6 is advantageous in that it can be produced with a comparatively small size and at a comparatively low cost.

Where the optical device 1 or 6 described above further includes an optical fiber with a lens for inputting the optical signal therethrough, it is advantageous in that it assures a good light collecting property for the optical signal.

In this instance, where the tapered prism 2 or the parallel flat plate transparent members 6-1 and 6-2 are made of a double refraction material and the optical fiber with a lens for inputting the optical signal is formed as a polarization plane keeping fiber, the optical device 1 or 6 is advantageous in that a particular polarization component of the optical signal may be transmitted through the optical fiber with a lens.

b. First Embodiment

Figure 5:
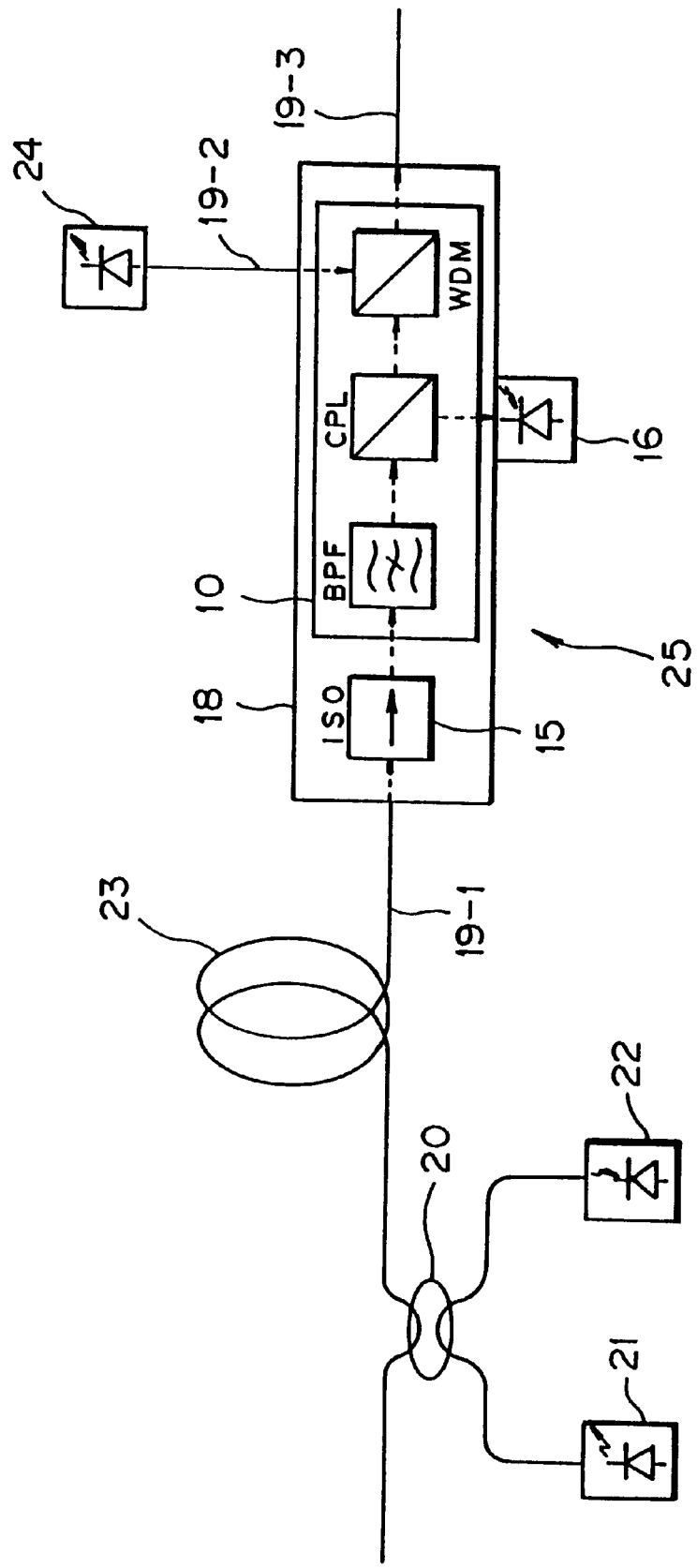
FIG. 5 is a block diagram showing a construction of an optical amplifier in which the optical module of FIG. 3 is incorporated.

Referring now to FIG. 5, there is shown an optical amplifier which employs an erbium-doped optical fiber. The optical amplifier is generally denoted at 25 and includes, as a rear circuit thereof, an optical module 18 which in turn includes an optical device 10 to which the present invention is applied. The optical amplifier 25 further includes an optical wave multiplexing coupler (WDM coupler) 20 of the fusion type, a pumping laser diode (LD) 21 for generating pump light, a monitoring photodiode (PD) 22, an erbium doped fiber 23 for amplifying an optical signal, and a supervisory laser diode (LD) 24 for generating supervisory light to be used for supervision of an optical signal against attenuation or deterioration.

The WDM coupler 20 optically couples an optical signal of, for example, 1.55 $\mu$m in wavelength inputted to the optical amplifier 25 and pump light of, for example, 1.48 $\mu$m in wavelength from the laser diode 21.

The photodiode 22 receives, in order to detect whether or not an optical signal is inputted to the optical amplifier 25, an optical signal leaking from the WDM coupler 20 and having an intensity reduced, for example, by approximately 15 dB and monitors the input level of the optical signal.

It is to be noted that, although an optical isolator is usually interposed between the WDM coupler 20 and the erbium doped fiber 23, such optical isolator is omitted to produce the optical amplifier 25 at a comparatively low cost, and instead, the pumping laser diode 21 includes a built-in isolator (not shown) therein.

Figure 3:
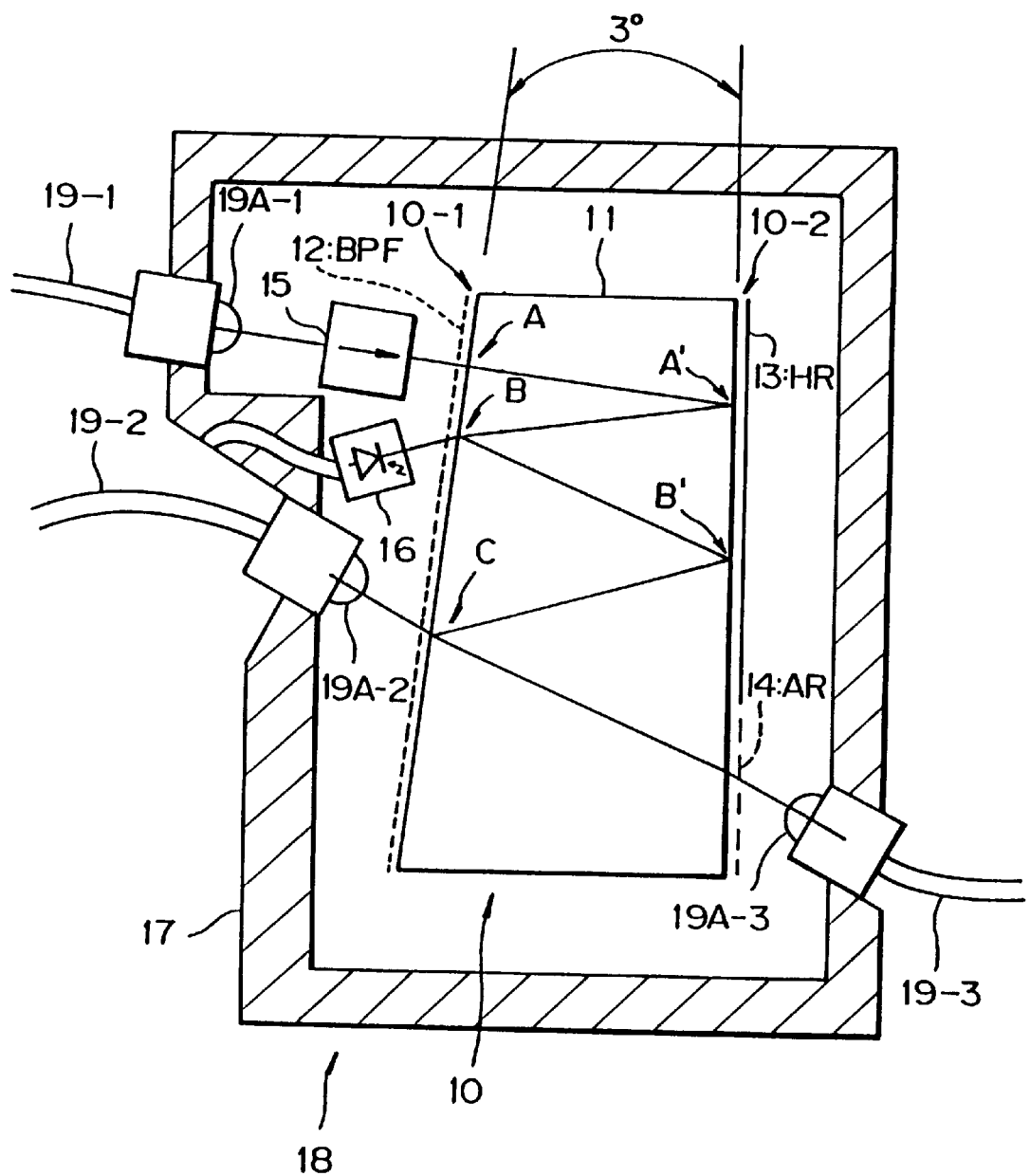
FIG. 3 is a schematic view of an optical module showing a first preferred embodiment of the present invention.

Referring now to FIG. 3, the optical module 18 in which the optical device 10 to which the present invention is applied is incorporated includes, in addition to the optical device 10, an isolator (ISO) 15 and a photodiode (PD) 16 in a package 17 thereof.

The optical device 10 includes a tapered prism 11 constructed such that a first face 10-1 and a second face 10-2 opposing to each other do not extend in parallel to each other but define an included angle (apex angle) of $\theta$ therebetween.

The first face 10-1 is positioned on the side of the tapered prism 11 to which an optical signal is inputted, and a band-pass filter (BPF) film 12 as a dielectric multi-layer film is formed on the first face 10-1. Meanwhile, the second face 10-2 has a total reflection film 13 (for example, a metal film) formed thereon such that it totally reflects an optical signal inputted thereto through the first face 10-1 at least once (two times in FIG. 3) toward the first face 10-1. The second face 10-2 of the tapered prism 11 further has a non-reflection film 14 formed thereon for extracting an optical signal inputted to and reflected in the tapered prism 11 therethrough.

The tapered prism 11 of the optical device 10 is made of, for example, a glass material for a prism, and the apex angle $\theta$ thereof is set to three or four degrees. It is to be noted that the point A of the optical device 10 is a first incident point of an optical signal to the BPF film 12, the point B a second incident point, and the point C a third incident point.

The optical device 10 is secured in the package 17, which is made of, for example, stainless steel, by adhesion or metallization soldering.

The isolator 15 serving as a non-reciprocal portion of an isolator of the non-polarization dependent type prevents the resonance of the optical amplifier 25 which will be hereinafter described and has the characteristic of the non-polarization dependency. While the isolator 15 is provided on the input side of an optical signal with respect to the optical device 10, it may alternatively be provided on the output side with respect to the optical device 10.

The photodiode 16 is securely soldered in the package 17 with the optical axis thereof adjusted in position. The photodiode 16 receives an optical signal leaking from the optical device 10 and monitors the output level of the optical signal in order to feed back the monitored output level to an automatic level controller which keeps the output level of the optical signal of the optical amplifier fixed.

All of an optical fiber 19-1 with a lens 19A-1 for the connection to an erbium-doped fiber, another optical fiber 19-3 with a lens 19A-3 for the connection to a transmission line and a further optical fiber 19-2 with a lens 19A-2 for the connection to a supervisory laser diode are securely soldered to the package 17 with the optical axes thereof adjusted in position. A collimate lens is used for the lenses 19A-1 to 19A-3, and the collimate lenses 19A-1 to 19A-3 are individually attached to optical fibers to construct the optical fibers 19-1 to 19-3 with a lens which have an improved light collection property for an optical signal. It is to be noted that the optical fiber 19-1 with a lens for receiving an optical signal as an input may be constructed as a polarization plane keeping fiber, and in this instance, a double refraction material may be used for the tapered prism 11.

Figure 4:
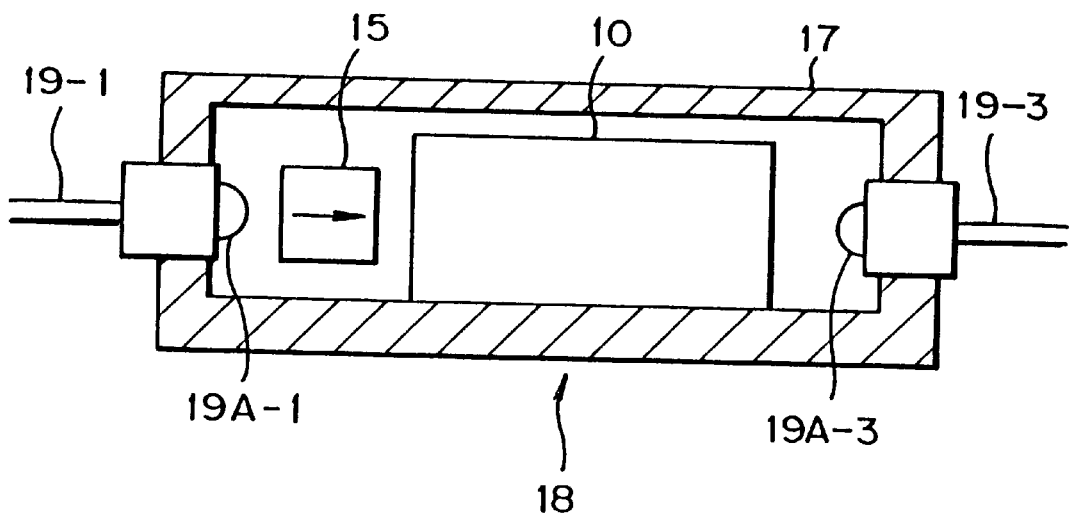
FIG. 4 is a schematic view of the optical module of FIG. 3 as viewed from a position adjacent an apex angle of the optical module.

In FIG. 4, the optical module 18 is shown as viewed from a position adjacent the apex angle of the tapered prism 11.

Referring to FIGS. 3 to 5, in the optical amplifier 25 having the construction described above, an optical signal amplified by the erbium doped fiber 23 is first inputted through the optical fiber 19-1 with the lens 19A-1 to the optical module 18 together with spontaneous emission light (ASE) generated in the erbium doped fiber 23 and remaining pump light which has not been used effectively as pump light. In the optical module 18, the optical signal is inputted to the first face 10-1 of the optical device 10 through the isolator 15. In this instance, in order to prevent returning reflection light from the first face 10-1, the optical signal is inputted by 0.5 degrees above a normal line to the second face 10-2 of the optical device 10.

Here, a variation of the wavelength characteristic of a dielectric multi-layer film when the incident angle varies, which is caused by multiple reflection of an optical signal, will be described with reference to FIGS. 6 to 8.

Figure 6:
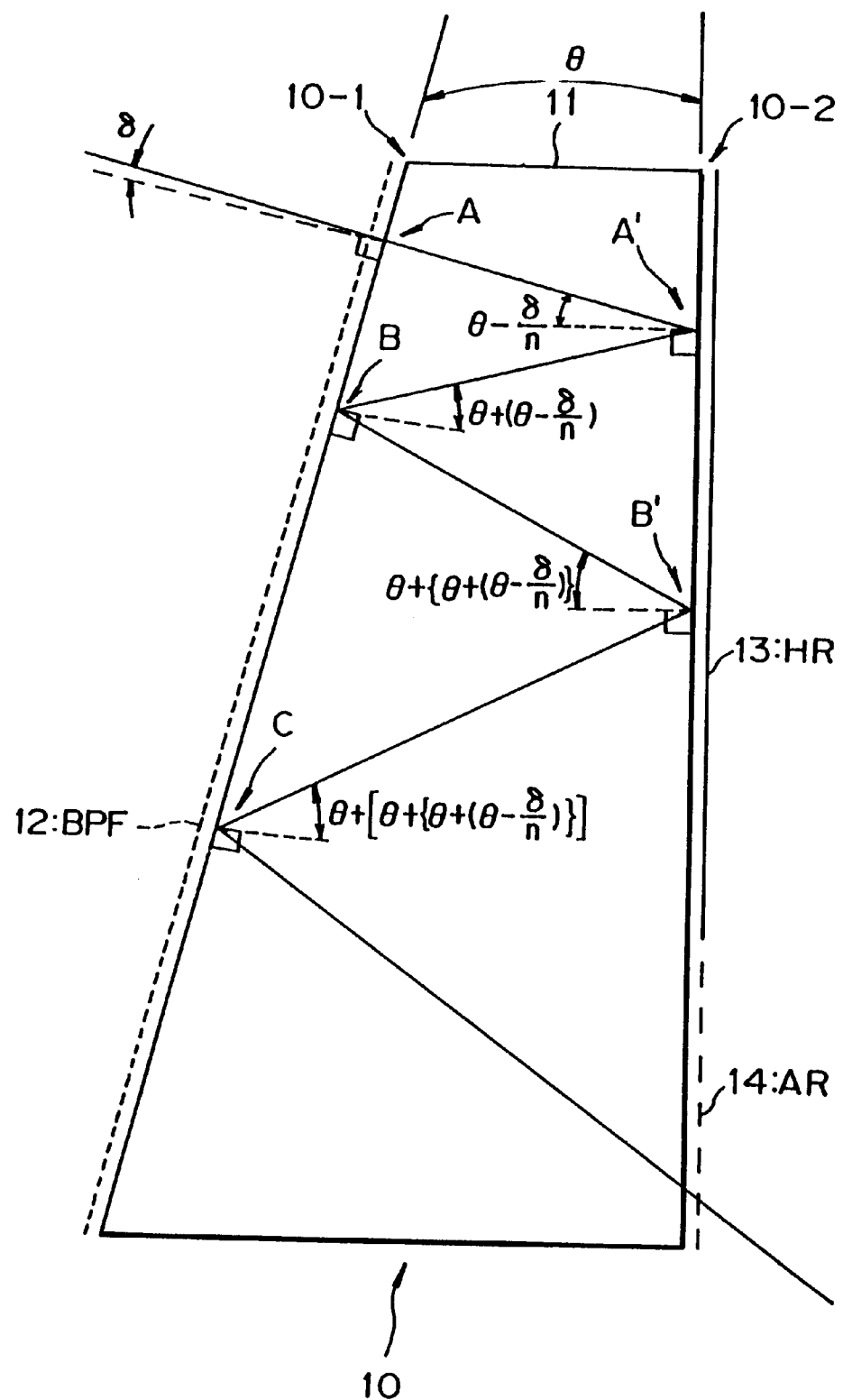
FIG. 6 is a diagrammatic view illustrating operation of the optical module of FIG. 3.

The variation of the incident angle at each reflection point when the input signal light is multiple reflected by and between the first face 10-1 and the second face 10-2 of the tapered prism 11 having the apex angle θ is illustrated in FIG. 6. It is to be noted that n in FIG. 6 denotes the refractive index of the tapered prism 11.

The optical signal inputted first at an angle δ to a point A of the first face 10-1 of the optical device 10 is inputted at another angle θ−(δ/n) to a point A' of the second face 10-2 which is the first reflection point, and is reflected at the equal angle θ−(δ/n) (but to the opposite direction with respect to the normal line, this similarly applies to the following description). Then, the optical signal is inputted at another angle θ+{θ−(δ/n)}=2θ−(δ/n) to another point B of the first face 10-1 which is the second reflection point.

Similarly, the optical signal inputted at the angle 2θ−(δ/n) to the point B of the first face 10-1 is inputted, after reflected from the point B, at a further angle θ+{2θ−(δ/n)}=3θ−(δ/n) to another point B' of the second face 10-2 which is the third reflection point. After reflected from the point B', the optical signal is inputted to and reflected from a further point C of the first face 10-1, which is the fourth reflection point, at a still further angle θ+{3θ−(δ/n)}=4θ−(δ/n).

In summary, the optical signal is inputted at the angle Nθ−(δ/n) to the Nth reflection point on the first face 10-1 or the second face 10-2.

Figure 7:
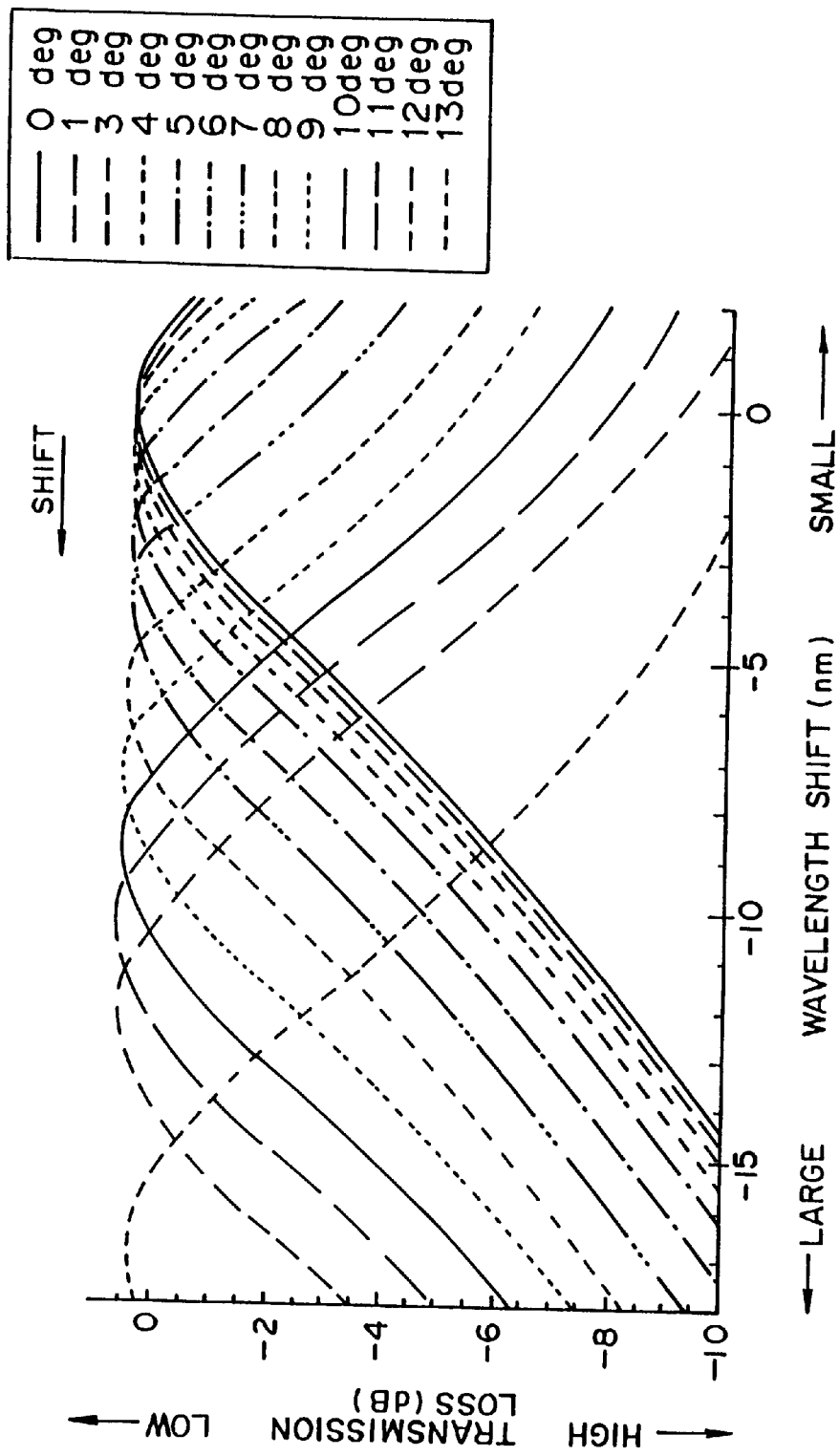
FIG. 7 is a diagram illustrating a wavelength shift of a dielectric multi-layer film.
Figure 8:
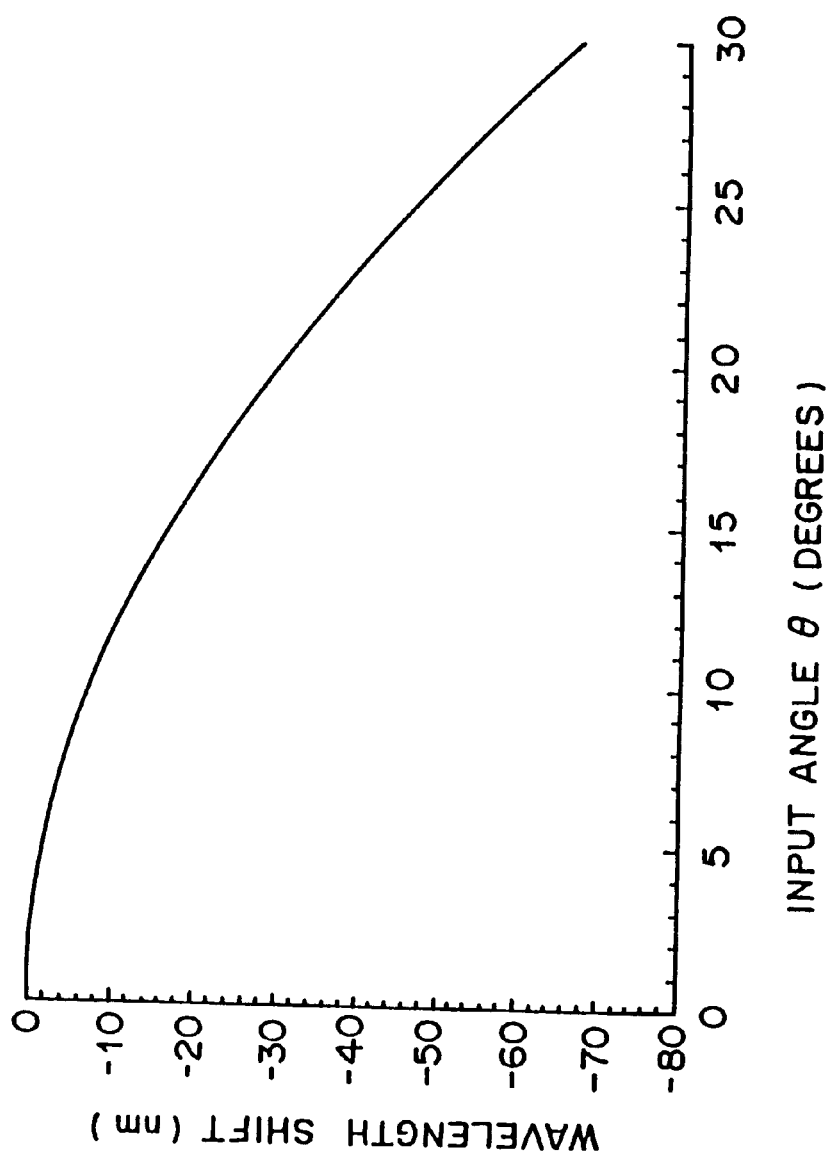
FIG. 8 is a diagram illustrating an example of relationship between the incident angle of an optical input to and a wavelength shift amount by a dielectric multi-layer film.

Meanwhile, the BPF film as a dielectric multi-layer film has such a wavelength characteristic that, as the angle θ increases, it shifts to the short wavelength side as seen from FIGS. 7 and 8.

In particular, the optical device 10 shown in FIG. 3 employs the BPF film 12 as a dielectric multi-layer film formed on the first face 10-1 as described above. Since the BPF film 12 has such a wavelength characteristic that it shifts to the short wavelength side in proportion to the square of the incident angle of an optical signal, as the incident angle of an optical signal reflected from the second face 10-2 to the first face 10-1 varies, the BPF film 12 exhibits different wavelength characteristics as hereinafter described.

Figure 9:
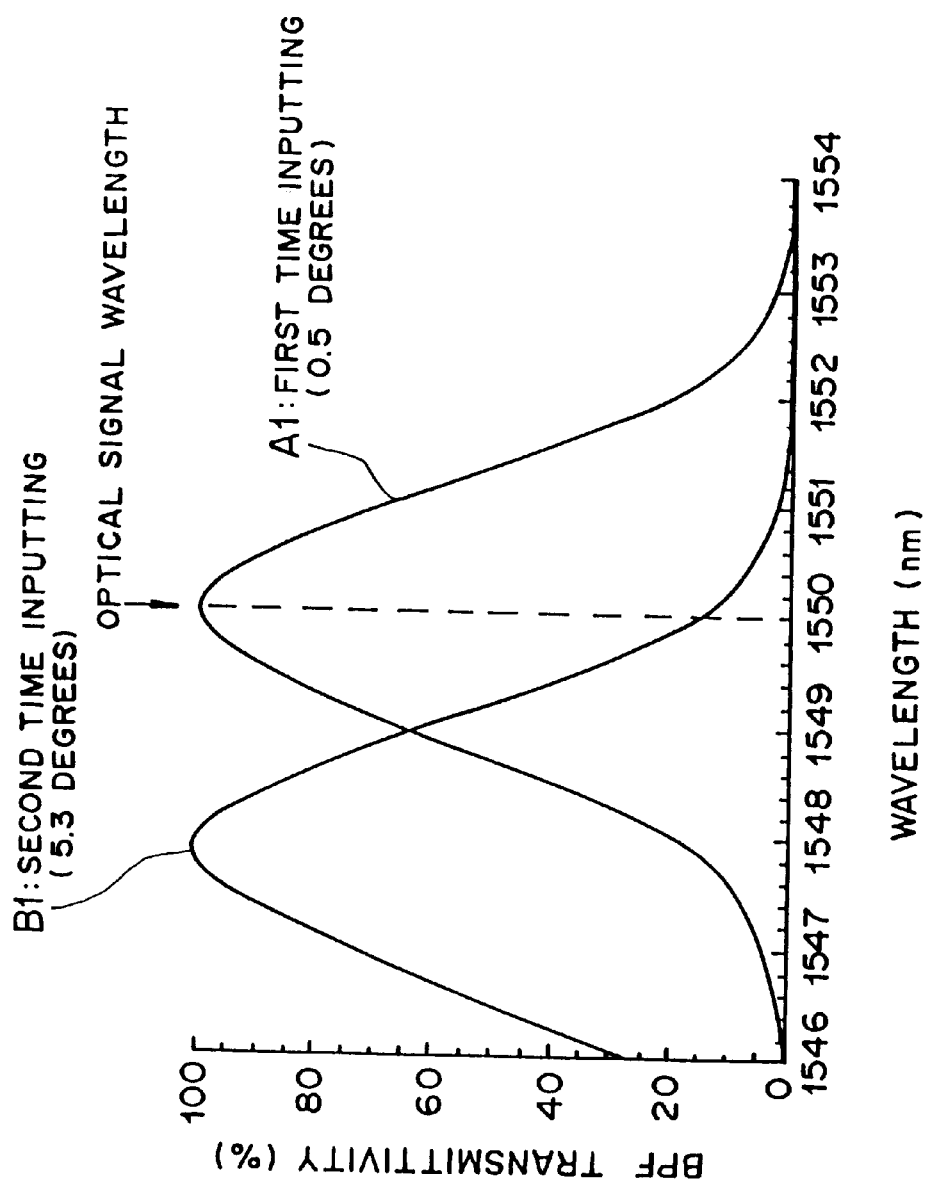
FIG. 9 is a diagram illustrating the wavelength characteristic of a band-pass filter as a dielectric multi-layer film.
Figure 10:
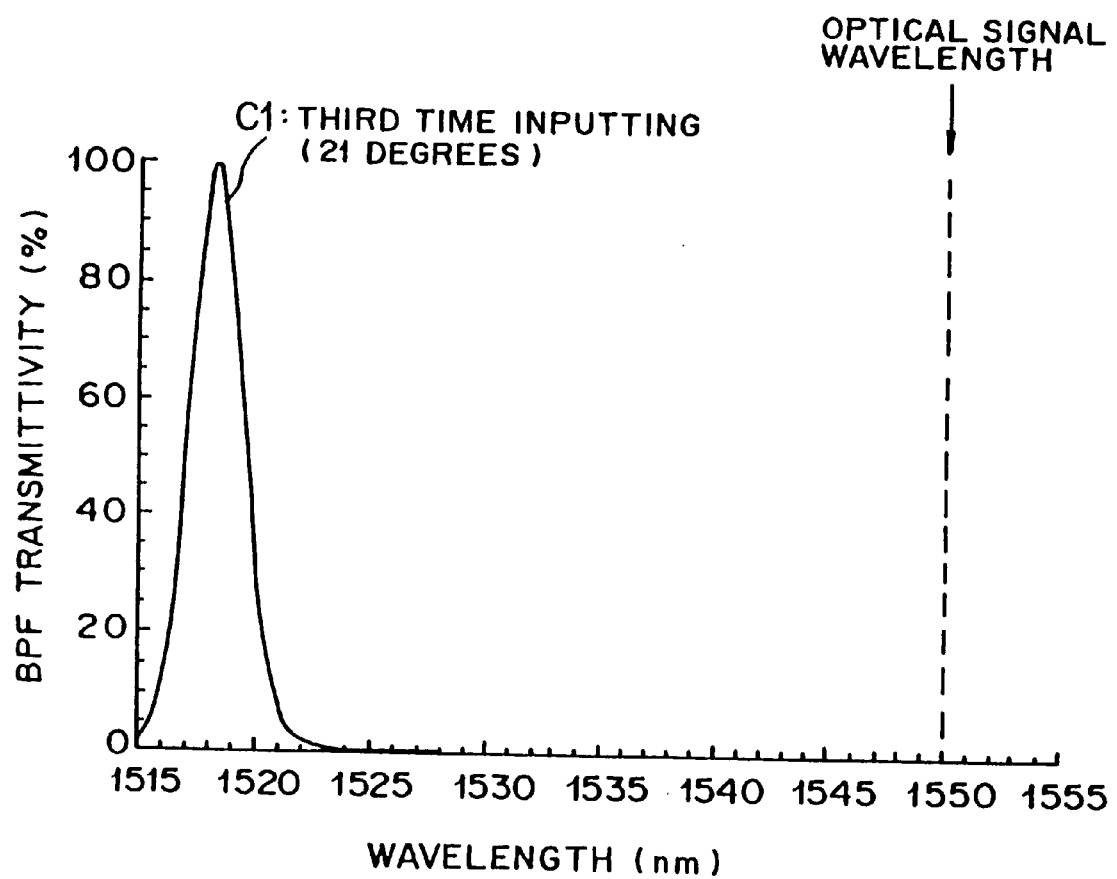

The different wavelength characteristics of the BPF film 12 when an optical input signal is inputted to the first face 10-1 of the optical device 10 are illustrated in FIGS. 9 and 10. The curves A1 and B1 in FIG. 9 and the curve C1 in FIG. 10 indicate the relationships between the wavelength and the transmittivity of an optical signal when the optical signal is inputted to the point A shown in FIG. 3 for the first time, when the optical signal is inputted to the point B for the second time and when the optical signal is inputted to the point C for the third time, respectively.

For example, the optical signal inputted at the angle of 0.5 degrees to the point A of the first face 10-1 of the optical device 10 is reflected for the first time by the second face 10-2 and then inputted for the second time at the angle of 5.3 degrees to the point B of the first face 10-1. Then, the optical signal is reflected for the second time from the second face 10-2 and is inputted for the third time at the angle of 21 degrees to the point C of the first face 10-1.

In this instance, in the BPF film 12 formed on the first face 10-1, when the optical signal is inputted for the first time, the optical signal of the wavelength of 1.55 μm passes at the point A while spontaneous emission light of the wavelength of 1.51 to 1.58 μm and pump light of the wavelength of 1.48 μm are intercepted. In other words, the optical device 10 functions, at the point A of the BPF film 12, as a band-pass filter (BPF). It is to be noted that the band-pass filter (BPF) is equivalent to the member denoted by the reference character of BPF in FIG. 5.

Then, when the optical signal is inputted for the second time, since the incident angle at the point B exhibits a variation of approximately 5 degrees, the wavelength characteristic of the BPF film 12 shifts, and consequently, approximately 15 percent of the optical signal of the wavelength of 1.55 μm passes at the point B while the remaining approximately 85 percent is reflected. It is to be noted that the passing optical signal of approximately 15 percent is inputted to the photodiode 16 and used to be fed back to the automatic level controller (ALC circuit) for keeping the output level of the optical signal of the optical amplifier to a fixed level. In other words, the optical device 10 functions, at the point B of the BPF film 12, as a coupler (CPL). It is to be noted that the coupler (CPL) is equivalent to the member denoted by reference character CPL in FIG. 5.

Further, when the optical signal is inputted for the third time, since the pass-band of the BPF film 12 at the point C is the central frequency of 1.518 μm, the optical signal of the wavelength of 1.55 μm is totally reflected while supervisory light of the wavelength of 1.518 μm inputted from the optical fiber 19-2 with a lens passes at the point B. Consequently, the optical signal and the supervisory light can be multiplexed with each other. In other words, the optical device 10 functions, at the point C of the BPF film 12, an optical wave multiplexer (WDM). It is to be noted that the optical wave multiplexer (WDM) is equivalent to the member denoted by reference character WDM in FIG. 5.

Finally, the multiplexed optical signal is outputted from the non-reflection film 14 of the second face 10-2 of the optical device 10 and sent out to a transmission line from the optical fiber 19-3 with the lens 19A-3.

Thus, it can be seen that the optical device 10 integrally includes the band-pass filter (BPF), the coupler (CPL) and the optical wave multiplexer (WDM) of the rear circuit shown in FIG. 5.

Figure 11:
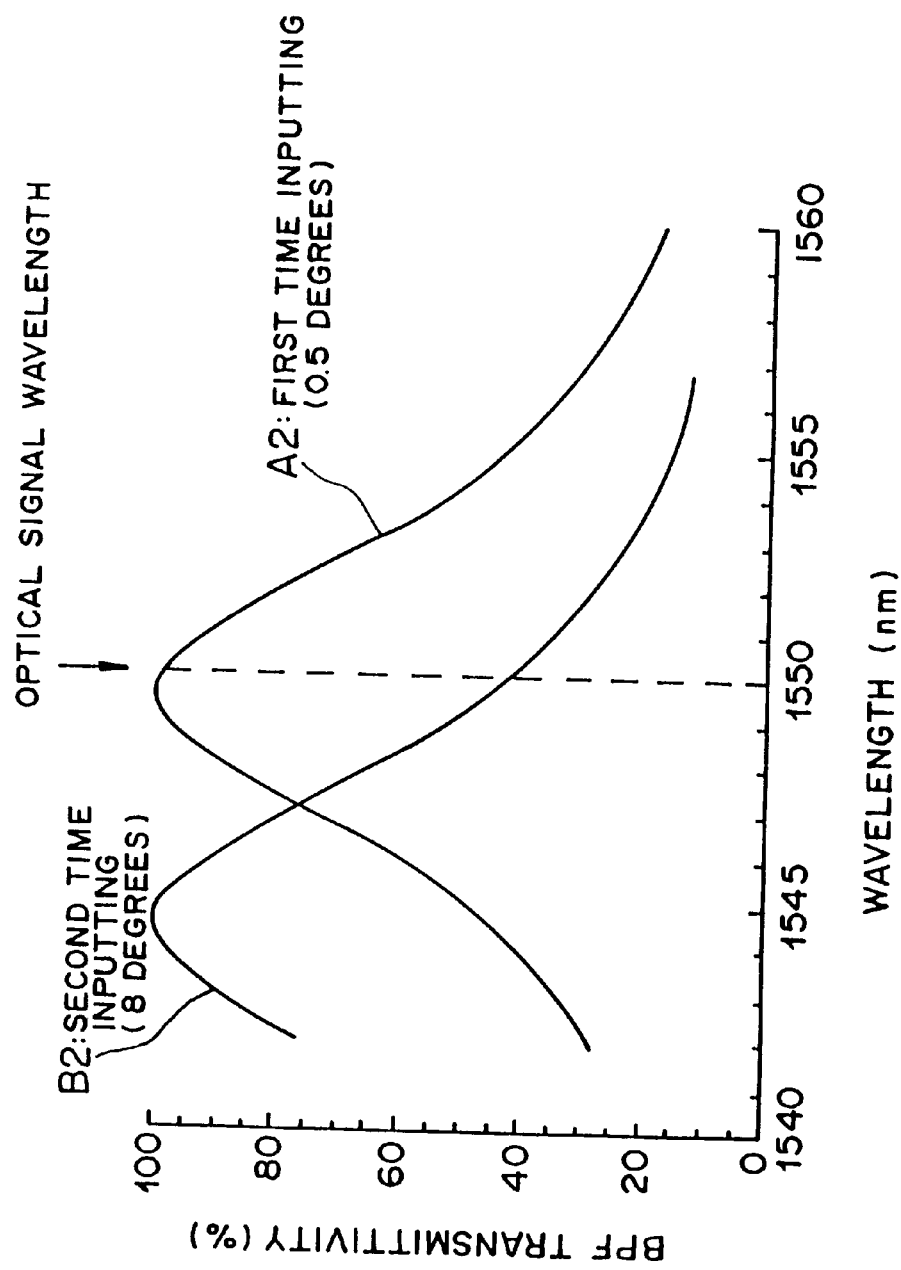

If the apex angle of the tapered prism 11 is set, for example, to 4 degrees, then the first face 10-1 of the optical device 10 can have such wavelength characteristics as illustrated in FIGS. 11 and 12 by changing the BPF film 12 so that it has another wavelength characteristic.

FIGS. 11 and 12 illustrate the wavelength characteristics of the BPF film 12 when an optical signal is inputted to the first face 10-1 of the optical device 10. The curves A2 and B2 in FIG. 11 and the curve C2 in FIG. 12 indicate the relationships between the wavelength and the transmittivity of an optical signal when the optical signal is inputted to the point A shown in FIG. 3 for the first time, when the optical signal is inputted to the point B for the second time and when the optical signal is inputted to the point C for the third time, respectively.

The optical signal inputted at the angle of 0.5 degrees to the point A of the first face 10-1 of the optical device 10 is reflected for the first time by the second face 10-2 and then inputted for the second time at the angle of 8 degrees to the point B of the first face 10-1. Then, the optical signal is reflected from the second face 10-2 for the second time and is inputted for the third time at the angle of 32 degrees to the point C of the first face 10-1.

In this instance, in the BPF film 12 formed on the first face 10-1, when the optical signal is inputted for the first time, the optical signal of the wavelength of 1.55 μm passes at the point A while spontaneous emission light of the wavelength of 1.51 to 1.58 μm and pump light of the wavelength of 1.48 μm are intercepted. Thus, the optical device 10 functions, at the point A of the BPF film 12, as a band-pass filter (BPF).

Then, when the optical signal is inputted for the second time, since the incident angle at the point B exhibits a variation of approximately 7.5 degrees, the wavelength characteristic of the BPF film 12 shifts, and approximately 40 percent of the optical signal of the wavelength of 1.55 μm passes at the point B while the remaining approximately 60 percent is reflected. It is to be noted that the passing optical signal of approximately 40 percent is inputted to the photodiode 16 and used to be fed back to the automatic level controller (ALC circuit) for keeping the output level of the optical signal of the optical amplifier to a fixed level. The optical device 10 thus functions, at the point B of the BPF film 12, as a coupler (CPL).

Further, when the optical signal is inputted for the third time, since the pass-band of the BPF film 12 at the point C is the central frequency of 1.473 μm, the optical signal of the wavelength of 1.55 μm is totally reflected. In this instance, supervisory light having such a wavelength that it can pass through the BPF film 12 can be inputted from the optical fiber 19-2 with a lens and multiplexed with the optical signal. Or, in place of the supervisory light, pump light of the wavelength of 1.48 μm can be inputted and multiplexed with the optical signal. In other words, the optical device 10 functions, at the point C of the BPF film 12, an optical wave multiplexer (WDM). The optical device 10 can be applied not only to an optical wave multiplexer (WDM) for multiplexing an optical signal and supervisory light, but also to an optical amplifier which performs rear pumping.

Finally, the multiplexed optical signal is outputted from the non-reflection film 14 of the second face 10-2 of the optical device 10 and sent out to the transmission line from the optical fiber 19-3 with the lens 19A-3.

Also in this instance, it can be seen that the optical device 10 integrally includes the band-pass filter (BPF), the coupler (CPL) and the optical wave multiplexer (WDM) of the rear circuit shown in FIG. 5.

Subsequently, operation of the optical amplifier 25 wherein the optical module 18 including the optical device 10 to which the present invention is applied is applied to the rear circuit of the optical amplifier 25 which employs an erbium-doped optical fiber as seen in FIG. 5 will be described.

First, an optical signal multiplexed by the WDM coupler 20 and pump light generated by the laser diode 21 are inputted to the erbium doped fiber 23, in which the optical signal is amplified with the energy of the pump light.

Then, the thus amplified optical signal is inputted from the optical fiber 19-1 with a lens to the optical module 18 serving as the rear circuit of the optical amplifier 25 together with spontaneous emission light (ASE) generated in the erbium doped fiber 23 and the remaining pump light which has not been used as pump light.

The optical signal inputted to the optical module 18 is introduced through the isolator 15 into the optical device 10 via the first face 10-1. Then, in the optical device 10, the optical signal is multiple reflected by and between the first face 10-1 and the second face 10-2 of the optical device 10. In this instance, the optical device 10 functions as a band-pass filter (BPF) for removing the spontaneous emission light (ASE) generated in the erbium doped fiber 23 and the remaining pump light which has not been used effectively as pump light, a coupler (CPL) for extracting monitor light and an optical wave multiplexer (WDM) for multiplexing the optical signal and the supervisory slight or pump light as described hereinabove. Then, the optical signal is outputted from the optical device 10 through the second face 10-2 to the optical fiber 19-3 with the lens 19A-3.

In this manner, the optical device according to the present embodiment has such a simple construction that it includes the tapered prism 11 constructed such that the first face 10-1 and the second face 10-2 thereof opposing to each other do not extend in parallel to each other and the BPF film 12 as a dielectric multi-layer film is formed on the first face 10-1 of the optical device 10 positioned on the side of the optical device 10 to which an optical signal is inputted while the total reflection film 13 for reflecting an optical signal inputted through the first face 10-1 at least once toward the first face 10-1 and besides the non-reflection film 14 for extracting an optical signal inputted to and reflected in the tapered prism 11 therethrough is formed on the second face 10-2 of the tapered prism 11. Consequently, the optical device 10 can integrally provide, to the optical module 18 which is constructed employing the optical device 10, the four functions of an isolator which prevents resonance of the amplifier and has no polarization dependency, a band-pass filter which intercepts pump light and spontaneous emission light, a coupler and photodiode for monitoring the level of an output optical signal, and an optical wave multiplexer for multiplexing a supervisory optical signal of the wavelength of 1.518 μm.

Consequently, operations which are usually performed by a plurality of optical films can be realized using a single dielectric multi-layer film. Accordingly, the cost for such optical films can be reduced, and the optical device can be produced with a comparatively small size and at a comparatively low cost.

It is to be noted, if a non-reflection film through which another optical signal can be inputted toward the optical input point of the first face 10-1 is formed at a portion of the second face 10-2 and a second optical signal of the wavelength of, for example, 1.558 μm is inputted through the non-reflection film, then an optical signal of the wavelength of, for example, 1.55 μm and the second optical signal can be multiplexed. Such optical device 10 can be applied to a wavelength multiplexing communication system in optical communications.

While the band-pass filter film 12 is employed as a dielectric multi-layer film formed on the first face 10-1 of the optical device 10, to which the present invention is applied, for intercepting pump light and spontaneous emission light, the dielectric multi-layer film is not limited to the specific band-pass filter film, and a long wavelength-pass filter film, a short wavelength-pass filter film, a band-block filter film or a branching film may alternatively be employed for the dielectric multi-layer film.

Further, while the total reflection film 13 (for example, a metal film) is employed as a reflection film formed on the second face 10-2 of the optical device 10, the reflection film is not limited to the specific total reflection film, and a band-pass filter film, a long wavelength-pass filter film, a short wavelength-pass filter film or a band-block filter may alternatively be employed for the reflection film.

Also in those cases, operations which are usually performed by a plurality of optical films can be realized using a single dielectric multi-layer film. Accordingly, the cost for such optical films can be reduced, and the optical device can be produced with a comparatively small size and at a comparatively low cost.

c. Second Embodiment

Figure 14:
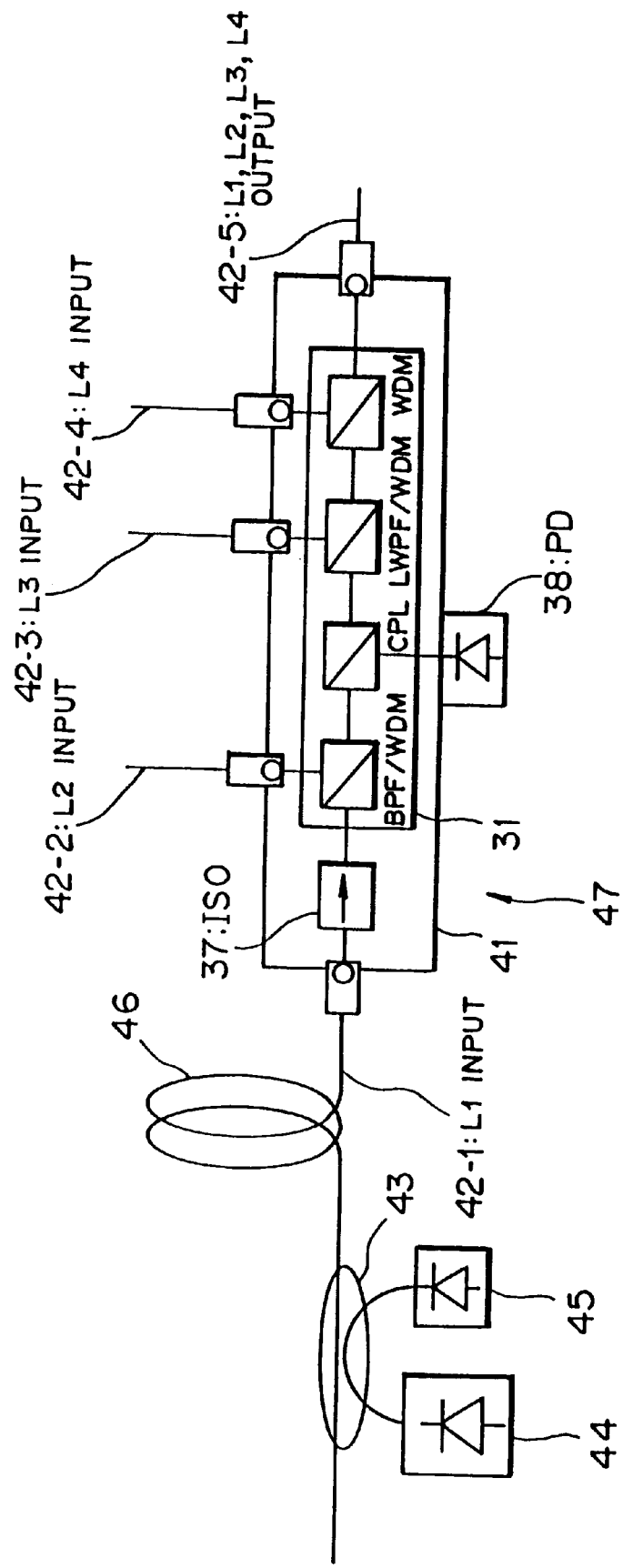
FIG. 14 is a block diagram showing a construction of an optical amplifier in which the optical module of FIG. 13 is incorporated.

Referring now to FIG. 14, there is shown another optical amplifier which employs an erbium-doped optical fiber. The optical amplifier is generally denoted at 47 and includes, as a rear circuit thereof, an optical module 41 which in turn includes an optical device 31 to which the present invention is applied. The optical amplifier 47 further includes an optical wave multiplexing coupler (WDM coupler) 43 of the fusion type, a pumping laser diode (LD) 44 for generating pump light, a monitoring photodiode (PD) 45, and an erbium doped fiber 46 for amplifying an optical signal. The WDM coupler 43, pumping laser diode 44, monitoring photodiode 45 and erbium doped fiber 46 have similar functions to those of the WDM coupler 20, pumping laser diode 21, monitoring photodiode 22 and erbium doped fiber 23 employed in the first embodiment described above, respectively. Therefore, detailed description of them is omitted here to avoid redundancy.

Figure 13:
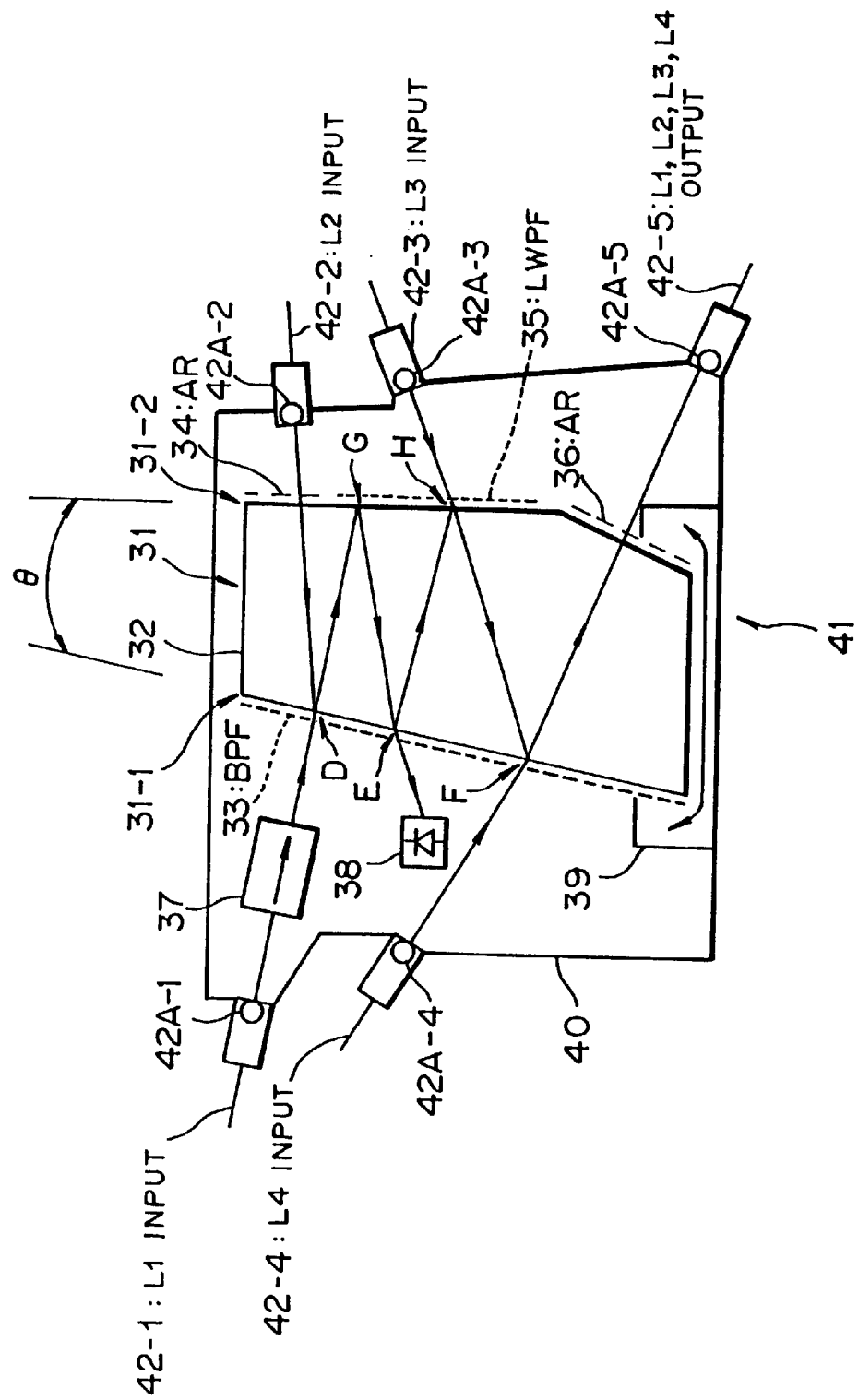
FIG. 13 is a schematic view of another optical module showing a second preferred embodiment of the present invention.

Referring now to FIG. 13, the optical module 41 in which the optical device 31 to which the present invention is applied is incorporated includes, in addition to the optical device 31, an isolator (ISO) 37, a photodiode (PD) 38, and a tapered prism tilting mechanism 39 for tilting an entire tapered prism 32 of the optical device 31, all accommodated in a package 40 thereof.

The tapered prism 32 of the optical device 31 is constructed such that a first face 31-1 and a second face 31-2 thereof opposing to each other do not extend in parallel to each other but define an included angle (apex angle) of θ therebetween.

The first face 31-1 is positioned on the side of the tapered prism 32 to which an optical signal is inputted, and a band-pass filter (BPF) film 33 as a dielectric multi-layer film is formed on the first face 31-1. Meanwhile, the second face 31-2 has a non-reflection film 34 formed thereon for admitting an optical signal into the tapered prism 32 therethrough. The second face 31-2 further has a long wavelength-pass filter film 35 formed thereon which serves as a reflection film which reflects an inputted optical signal at least once toward the first face 31-1 or passes an inputted optical signal therethrough as the incident angle of the inputted optical signal varies.

The second face 31-2 of the tapered prism 32 further has another non-reflection film 36 formed thereon for extracting an optical signal inputted to and reflected in the tapered prism 32 therethrough. The face of the tapered prism 32 on which the non-reflection film 36 is formed is disposed normally to an output optical path in order to prevent a variation in optical path direction of an optical signal to be outputted.

The tapered prism 32 of the optical device 31 is made of, for example, a glass material for a prism. The point D of the optical device 31 is a first incident point of an optical signal to the BPF film 33, the point E a second incident point, and the point F a third incident point. Further, the point G is a first reflection point of the optical signal on the long wavelength-pass filter (LWPF) film 35, and the point H a second reflection point.

The optical device 31 is provided on the tapered prism tilting mechanism 39 secured in the package 40, which is made of, for example, stainless steel, by adhesion or metallization soldering. The tapered prism tilting mechanism 39 can tilt the entire tapered prism 32 to adjust the angle of the optical device 31 formed from the tapered prism 32 with respect to the optical path of an optical signal to adjust the delicate wavelength characteristic of the dielectric multi-layer film.

The isolator 37 serving as a non-reciprocal portion of an isolator of the non-polarization dependent type prevents resonance of the optical amplifier 47 which will be hereinafter described and has the characteristic of the non-polarization dependency. While the isolator 37 is provided on the input side of an optical signal with respect to the optical device 31, it may alternatively be provided on the output side with respect to the optical device 31.

The photodiode 38 is securely soldered in the package 40 with the optical axis thereof adjusted in position. The photodiode 38 receives an optical signal leaking from the optical device 31 and monitors the output level of the optical signal of the optical amplifier in order to feed back the monitored output level of the optical signal to an automatic level controller which keeps the output level of the optical signal of the optical amplifier fixed.

All of an optical fiber 42-1 with a lens 42A-1 for inputting an optical signal L1, another optical fiber 42-2 with a lens 42A-2 for inputting another optical signal L2, a further optical fiber 42-3 with a lens 42A-3 for inputting a further optical signal L3, a still further optical fiber 42-4 with a lens 42A-4 for inputting a still further optical signal L4, and a yet further optical fiber 42-5 with a lens 42A-5 for outputting an optical signal are securely soldered to the package 40 with the optical axes thereof adjusted in position. A collimate lens is used for the lenses 42A-1 to 42A-5, and such collimate lenses 42A-1 to 42A-5 are individually attached to optical fibers to construct the optical fibers 42-1 to 42-5 with a lens which have an improved light collection property for an optical signal. It is to be noted that the optical fibers 42-1 to 42-4 with a lens for inputting an optical signal may be constructed as a polarization plane keeping fiber, and in this instance, a double refraction material may be used for the tapered prism 32.

Referring to FIGS. 13 and 14, in the optical amplifier 47 having the construction described above, an optical signal amplified by the erbium doped fiber 46 is first inputted as an optical signal L1 through the optical fiber 42-1 with a lens to the optical module 41 together with spontaneous emission light generated in the erbium doped fiber 46 and remaining pump light which has not been used effectively as pump light. In the optical module 41, the optical signal is inputted to the first face 31-1 of the optical device 31 through the isolator 37. In this instance, in order to prevent returning reflection light from the first face 31-1, the optical signal is inputted by 0.5 degrees above a normal line to the second face 31-2 of the optical device 31.

Here, a variation of the wavelength characteristic of the dielectric multi-layer film when the incident angle varies, which is caused by multiple reflection of an optical signal, will be described with reference to FIGS. 15 and 16.

Also with the optical device 31, since the first face 31-1 and the second face 31-2 of the tapered prism 32 opposing to each other do not extend in parallel to each other, when an inputted optical signal is multiple reflected by and between the first face 31-1 and the second face 31-2, it has several different incident angles similarly as in the optical device described hereinabove in connection with the first embodiment.

Figure 15:
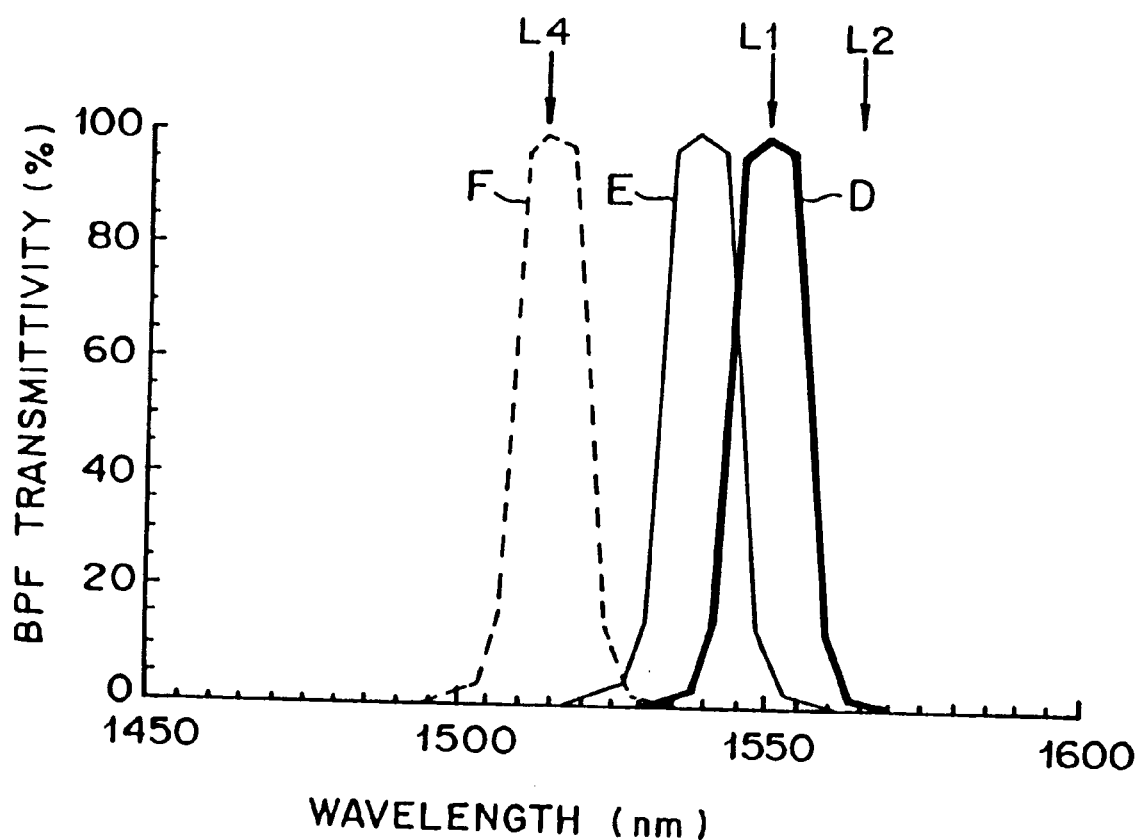
FIGS. 15 and 16 are diagrams illustrating different wavelength characteristics of a long wavelength-pass filter as a dielectric multi-layer film.
Figure 16:
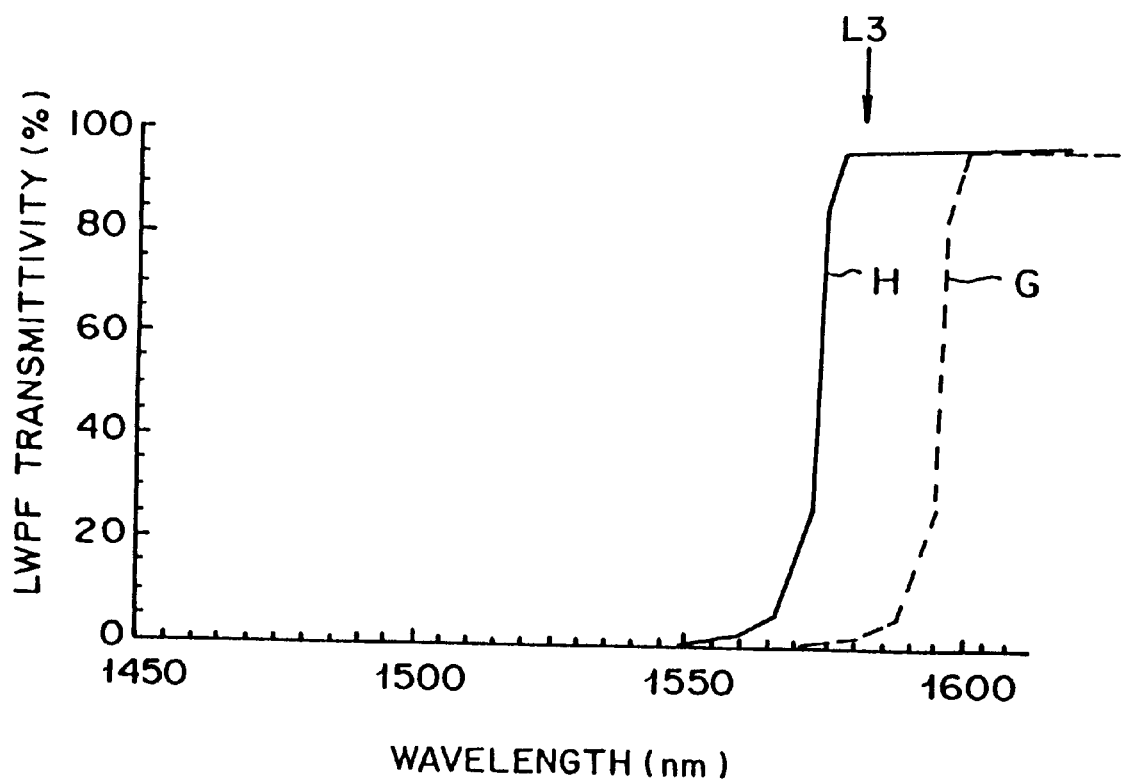

While the optical device 31 employs the band-pass filter film (BPF) 33 as a dielectric multi-layer film formed on the first face 31-1 and employs the long wavelength-pass filter (LWPF) film 35 as another dielectric multi-layer film formed on the second face 31-2, since the BPF film 33 and the LWPF film 35 have a wavelength characteristic which shifts to the short wavelength side as the incident angle of the input signal increases, the dielectric multi-layer films of the BPF film 33 and the LWPF film 35 have different wavelength characteristics as the incident angle of the input signal varies as shown in FIGS. 15 and 16, respectively.

FIG. 15 illustrates the wavelength characteristics of the BPF film 33 when an optical signal is inputted to the first face 31-1 of the optical device 31. In particular, the curves D, E and F in FIG. 15 indicate the relationships between the wavelength and the transmittivity of an optical signal when the optical signal is inputted to the point D shown in FIG. 13 for the first time, when the optical signal is inputted to the point E for the second time and when the optical signal is inputted to the point F for the third time, respectively.

Meanwhile, FIG. 16 illustrates the wavelength characteristics of the LWPF film 35 when an optical signal is inputted to the second face 31-2 of the optical device 31. In particular, the curves G and H in FIG. 16 indicate the relationships between the wavelength and the transmittivity of an optical signal when the optical signal is reflected at the point G shown in FIG. 13 for the first time and when the optical signal is reflected at the point H for the second time, respectively.

The optical signal L1 inputted to the point D of the first face 31-1 of the optical device 31 is reflected for the first time at the point G of the second face 31-2 and then inputted for the second time to the point E of the second face 31-2. Then, the optical signal is reflected for the second time at the point H of the second face 31-2 and then inputted for the third time to the point F of the first face 31-1.

Simultaneously, the optical signal L2 is inputted through the non-reflection film 34 of the second face 31-2 to the point D of the first face 31-1; the optical signal L3 is inputted through the point H of the second face 31-2 to the point F of the first face 31-1; and the optical signal L4 is inputted through the point F of the second face 31-2.

In this instance, when the optical signals L1 and L2 are inputted for the first time to the point D of the BPF film 33 formed on the first face 31-1, the optical signal L1 having the wavelength of 1.55 $\mu$m passes at the point D while spontaneous emission light of the wavelength of 1.51 to 1.54 $\mu$m and pump light of the wavelength of 1.48 $\mu$m are intercepted. Further, the optical signal L2 of the wavelength of 1.565 $\mu$m is reflected at the point D. Consequently, the optical signals L1 and L2 are multiplexed with each other. In other words, the optical device 31 functions, at the point D of the BPF film 33, as a band-pass filter (BPF) and also as an optical wave multiplexer (WDM). It is to be noted that the band-pass filter (BPF) and the optical wave multiplexer (WDM) are equivalent to the member denoted by the reference character BPF/WDM in FIG. 14.

Then, the multiplexed optical signal of the optical signals L1 and L2 is reflected at the point G of the LWPF film 35 formed on the second face 31-2 and inputted to the point E of the BPF film 33 of the first face 31-1. At the point E of the BPF film 33 of the first face 31-1, approximately 10 percent of the optical signal of the wavelength of 1.55 $\mu$m passes while the remaining approximately 90 percent of the light signal L1 and the optical signal L2 are reflected since the wavelength characteristic of the BPF film 33 of the first face 31-1 shifts as the input angles of the optical signals vary. It is to be noted that the passing optical signal L1 of approximately 10 percent is inputted to the photodiode 38 and used to be fed back to the automatic level controller (ALC circuit) for keeping the output level of the optical signal of the optical amplifier to a fixed level. In other words, the optical device 31 functions, at the point E of the BPF film 33, as a coupler (CPL). It is to be noted that the coupler CPL) is equivalent to the member denoted by the reference character CPL in FIG. 14.

Further, at the point H of the LWPF film 35 of the second face 31-2, the multiplexed optical signal of the reflected optical signals L1 and L2 is reflected while the optical signal L3 of the wavelength of 1.58 $\mu$m passes. Consequently, the optical signals L1 to L3 are multiplexed. In other words, the optical device 31 functions, at the point H of the LWPF film 35, a long wavelength-pass filter (LWPF) as well as an optical wave multiplexer (WDM). It is to be noted that the long wavelength-pass filter (LWPF) and the optical wave multiplexer (WDM) are equivalent to the member denoted by the reference character LWPF/WDM in FIG. 14.

Furthermore, at the point F of the BPF film 33 of the first face 31-1, the optical signal L4 of the wavelength of 1.515 $\mu$m passes while the multiplexed optical signal of the optical signals L1 to L3 is reflected. Consequently, the optical signals L1 to L4 inputted to the tapered prism 32 are multiplexed. In other words, the optical device 31 functions, at the point F of the BPF film 33, an optical wave multiplexer (WDM). It is to be noted that the optical wave multiplexer (WDM) is equivalent to the member denoted by the reference character WDM in FIG. 14.

Finally, the multiplexed optical signal is outputted from the non-reflection film 36 of the second face 31-2 of the optical device 31 and sent out to a transmission line from the optical fiber 42-5 with the lens 42A-5.

Thus, it can be seen that the optical device 31 integrally includes the band-pass filter and optical wave multiplexer (BPF/WDM), the coupler (CPL), the long wavelength-pass filter and optical wave multiplexer (LWPF/WDM) and the optical wave multiplexer (WDM) of the rear circuit shown in FIG. 14.

Subsequently, operation of the optical amplifier 47 wherein the optical module 41 including the optical device 31 to which the present invention is applied is applied to the rear circuit of the optical amplifier 47 which employs an erbium-doped optical fiber as seen in FIG. 14 will be described.

First, an optical signal multiplexed by the WDM coupler 43 and pump light generated by the laser diode 44 are inputted to the erbium doped fiber 46, in which the optical signal is amplified with the energy of the pump light.

Then, the thus amplified optical signal is inputted from the optical fiber 42-1 with a lens to the optical module 41 serving as the rear circuit of the optical amplifier 47 together with spontaneous emission light (ASE) generated in the erbium doped fiber 46 and remaining pump light which has not been used effectively as pump light.

The optical signal inputted to the optical module 41 is introduced through the isolator 37 into the optical device 31 via the first face 31-1. Then, in the optical device 31, the optical signal is multiple reflected by and between the first face 31-1 and the second face 31-2 of the optical device 31. In this instance, the optical device 31 functions as a band-pass filter for removing the spontaneous emission light generated in the erbium doped fiber 46 and the remaining pump light which has not been used effectively as pump light, a coupler for extracting monitor light and an optical wave multiplexer for multiplexing the optical signal and a plurality of optical signals inputted to the optical device 31. Then, the optical signal is outputted from the optical device 31 through the second face 31-2 to the optical fiber 42-5 with a lens.

In this manner, the optical device 31 according to the present embodiment has such a simple construction that it includes the tapered prism 32 constructed such that the first face 31-1 and the second face 31-2 thereof opposing to each other do not extend in parallel to each other and the BPF film 33 as a dielectric multi-layer film is formed on the first face 31-1 of the optical device 31 while the long wavelength-pass filter film 35 as a reflection film and the non-reflection films 34 and 36 are formed on the second face 31-2 of the tapered prism 32. Consequently, the optical device 31 can provide, to the optical module 41 which is constructed employing the optical device 31, the four functions of an isolator which prevents resonance of the amplifier and has no polarization dependency, a band-pass filter which intercepts pump light and spontaneous emission light, a coupler and photodiode for monitoring the level of an output optical signal, and an optical wave multiplexer for multiplexing a plurality of optical signals. The optical module 41 can be applied also to a wavelength multiplexing communication system in optical communication.

Consequently, operations which are usually performed by a plurality of optical films can be realized using two dielectric multi-layer films. Accordingly, the cost for such optical films can be reduced, and the optical device can be produced with a comparatively small size and at a comparatively low cost.

It is to be noted, while the BPF film 33 is employed as a dielectric multi-layer film formed on the first face 31-1 of the optical device 31 to which the present invention is applied, the dielectric multi-layer film is not limited to the specific band-pass filter film, and a long wavelength-pass filter film, a short wavelength-pass filter film, a band-block filter film or a branching film may alternatively be employed for the dielectric multi-layer film. Further, while the long wavelength-pass filter film 35 is employed as a reflection film formed on the second face 31-2 of the optical device 31, the reflection film is not limited to the specific total reflection film, and a band-pass filter film, a short wavelength-pass filter film, a band-block filter film or a branching film may alternatively be employed for the reflection film.

Also in those cases, operations which are usually performed by a plurality of optical films can be realized only using two dielectric multi-layer films. Accordingly, the cost for such optical films can be reduced, and the optical device can be produced with a comparatively small size and at a comparatively low cost.

d. Third Embodiment

Figure 17:
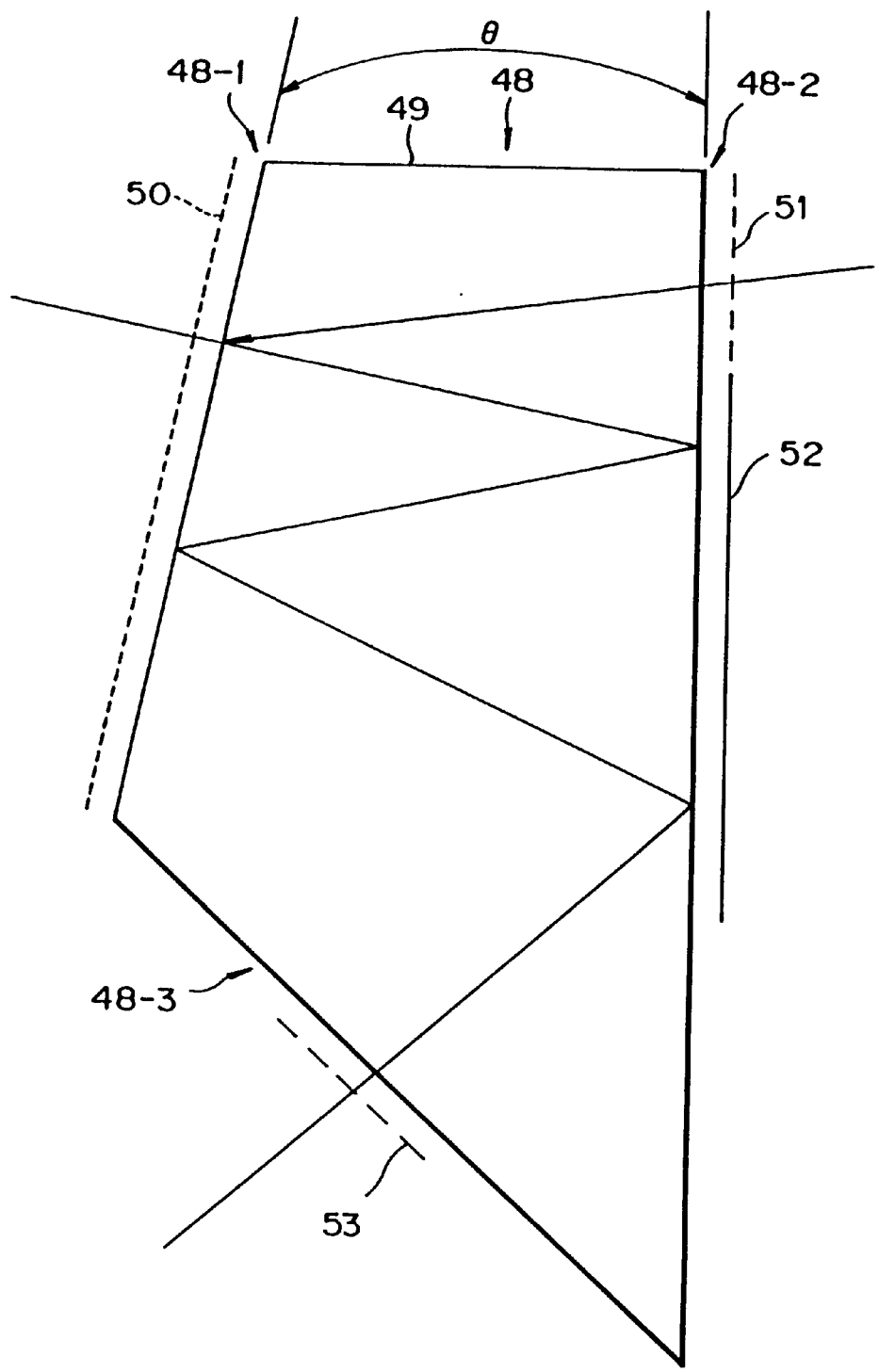
FIG. 17 is a schematic view of a further optical device showing a third preferred embodiment of the present invention.

Referring now to FIG. 17, there is shown an optical device according to a third preferred embodiment of the present invention. The optical device is generally denoted at 48 and includes a tapered prism 49 constructed such that a first face 48-1 and a second face 48-2 thereof opposing to each other do not extend in parallel to each other but define an included angle (apex angle) of $\theta$ therebetween.

The first face 48-1 is positioned on the side of the tapered prism 49 to which an optical signal is inputted, and a dielectric multi-layer film 50 is formed on the first face 48-1. Meanwhile, the second face 48-2 as a reflection film 52 formed thereon which reflects an optical signal inputted through the first face 48-1 at least once (two times in FIG. 17) toward the first face 48-1. The second face 48-2 further has a non-reflection film 51 formed thereon which admits an optical signal into the tapered prism 49 therethrough.

Further, in the optical device 48 of the present embodiment, a non-reflection film 53 is provided on a third face 48-3, which is another face of the tapered prism 49 contiguous to the first face 48-1, such that it extends perpendicularly to an output optical path in order to extract an optical signal inputted to and reflected by the tapered prism 49.

With the optical device 48 of the present embodiment having the construction described above, similarly with the optical devices of the first and second embodiments of the present invention, an optical device which is usually constructed using a plurality of optical elements or a plurality of optical films is constructed using a single optical element. Accordingly, the number of operations for the connection of fibers can be reduced, and the optical device can be produced with a comparatively small size and at a comparatively low cost. Further, the optical device can be applied also to a wavelength multiplexing communication system in optical communications.

Further, since operations which are usually performed by a plurality of optical films can be realized using a single dielectric multi-layer film, the cost for such optical films can be reduced, and the optical device can be produced with a comparatively small size and at a comparatively low cost.

It is to be noted, for the dielectric multi-layer film 50 formed on the first face 48-1 of the optical device 48 of the preferred embodiment of the present invention for intercepting pump light and spontaneous emission light, a band-pass filter film, a long wavelength-pass filter film, a short wavelength-pass filter film, a band-block filter film or a branching film can be employed, and for the reflection film 52 formed on the second face 48-2 of the optical device 48, a total reflection film (for example, a metal film), a band-pass filter film, a long wavelength-pass filter film, a short wavelength-pass filter film or a band-block filter film can be employed.

Also in those cases, operations which are usually performed by a plurality of optical films can be realized only using two dielectric multi-layer films. Accordingly, the cost for such optical films can be reduced, and the optical device can be produced with a comparatively small size and at a comparatively low cost.

e. Fourth Embodiment

Figure 18:
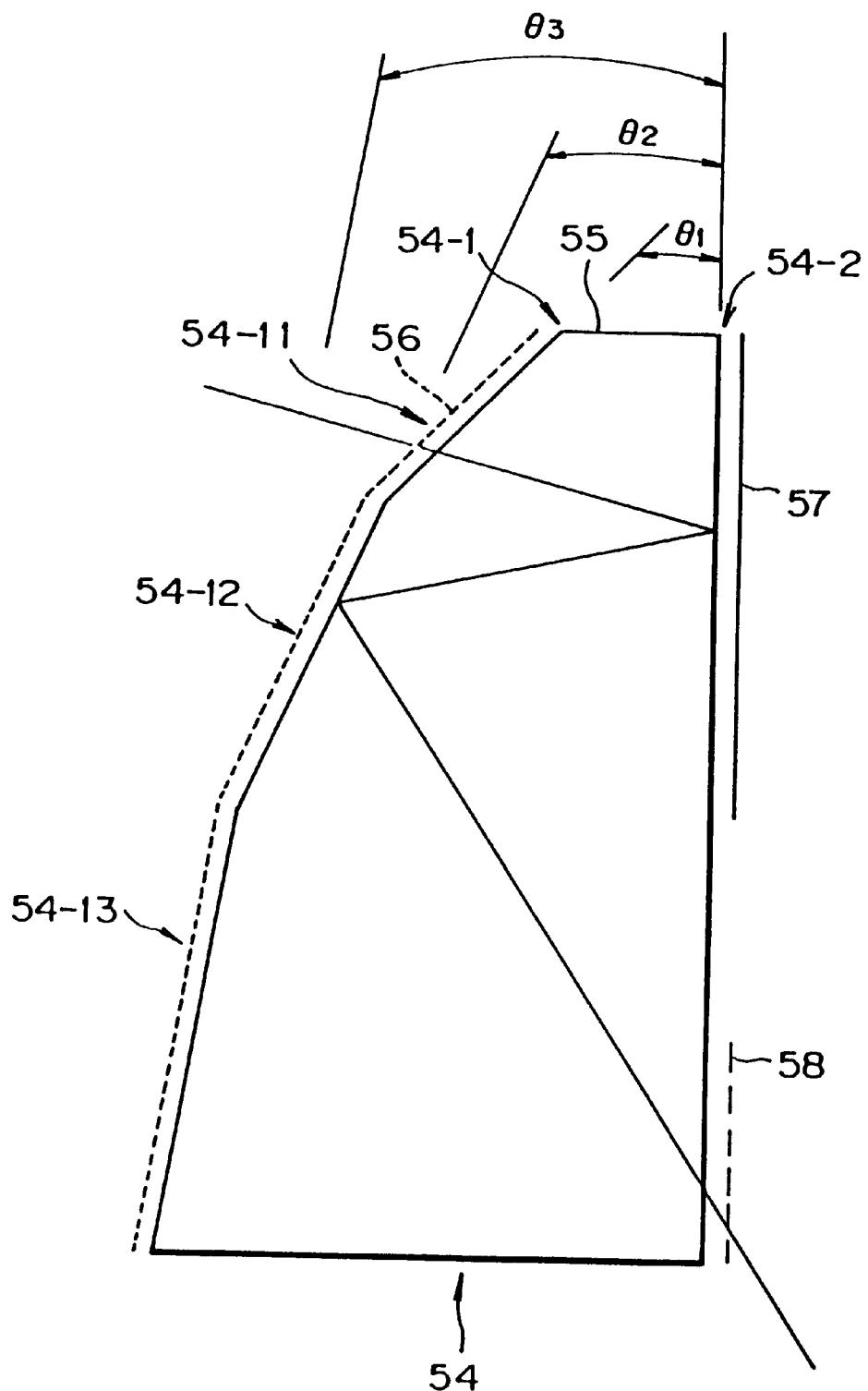
FIG. 18 is a schematic view of a still further optical device showing a fourth preferred embodiment of the present invention.

Referring now to FIG. 18, there is shown an optical device according to a fourth preferred embodiment of the present invention. The optical device is generally denoted at 54 and includes a polygonal prism 55 which has a first face 54-1 including a plurality of different inclined faces 54-11 to 54-13 and a second face 54-2. It is to be noted that the angle (apex angle) defined between the inclined face 54-11 and the second face 54-2 is represented by $\theta 1$; the angle (apex angle) defined between the inclined face 54-12 and the second face 54-2 is represented by $\theta 2$; and the angle (apex angle) defined between the inclined face 54-13 and the second face 54-2 is represented by $\theta 3$.

The first face 54-1 is positioned on the side of the polygonal prism 55 to which an optical signal is inputted, and a dielectric multi-layer film 56 is formed on the first face 54-1. Meanwhile, the second face 54-2 has a reflection film 57 formed thereon which reflects an optical signal inputted through the first face 54-1 at least once (once in FIG. 18) toward the first face 54-1. The second face 54-2 further has a non-reflection film 58 formed thereon for extracting an optical signal inputted to and reflected in the polygonal prism 55 therethrough.

Also with the optical device 54 of the present embodiment having the construction described above, since operations which are usually performed by a plurality of optical films can be realized using a single dielectric multi-layer film, the cost for such optical films can be reduced, and the optical device can be produced with a comparatively small size and at a comparatively low cost.

It is to be noted, for the dielectric multi-layer film 56 formed on the first face 54-1 of the optical device 54 of the present embodiment for intercepting pump light and spontaneous emission light, a band-pass filter film, a long wavelength-pass filter film, a short wavelength-pass filter film, a band-block filter film or a branching film can be employed, and for the reflection film 57 formed on the second face 54-2 of the optical device 54, a total reflection film (for example, a metal film), a band-pass filter film, a long wavelength-pass filter film, a short wavelength-pass filter film or a band-block filter film can be employed.

Also in those cases, operations which are usually performed by a plurality of optical films can be realized only using a single dielectric multi-layer film. Accordingly, the cost for such optical films can be reduced, and the optical device can be produced with a comparatively small size and at a comparatively low cost.

f. Fifth Embodiment

Figure 20:
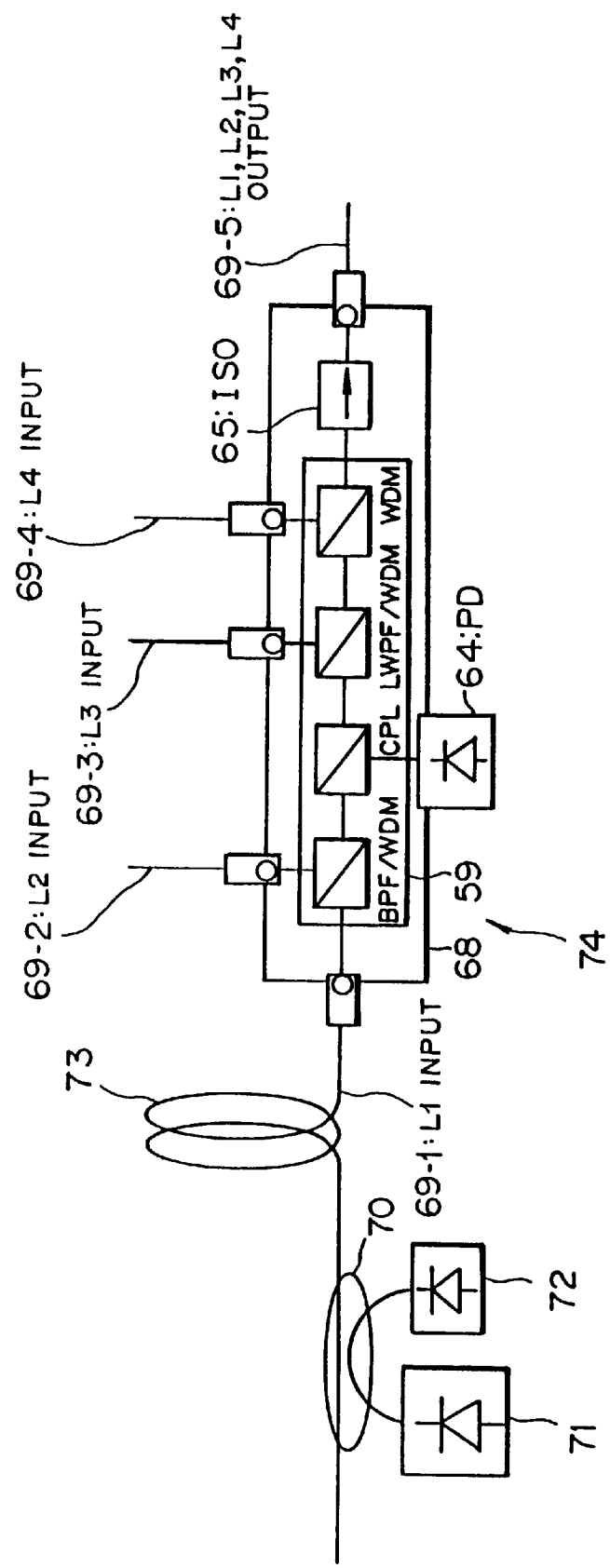
FIG. 20 is a block diagram showing a construction of an optical amplifier in which the optical module of FIG. 19 is incorporated.

Referring now to FIG. 20, there is shown a further optical amplifier which employs an erbium-doped optical fiber. The optical amplifier is generally denoted at 74 and includes, as a rear circuit thereof, an optical module 68 which in turn includes an optical device 59 to which the present invention is applied. The optical amplifier 74 further includes an optical wave multiplexing coupler (WDM coupler) 70 of the fusion type, a pumping laser diode (LD) 71 for generating pump light, a monitoring photodiode (PD) 72, and an erbium doped fiber 73 for amplifying an optical signal. The WDM coupler 70, pumping laser diode 71, monitoring photodiode 72 and erbium doped fiber 73 have similar functions to those of the WDM coupler 20, pumping laser diode 21, monitoring photodiode 22 and erbium doped fiber 23 employed in the first embodiment described above, respectively. Therefore, detailed description of them is omitted here to avoid redundancy.

Figure 19:
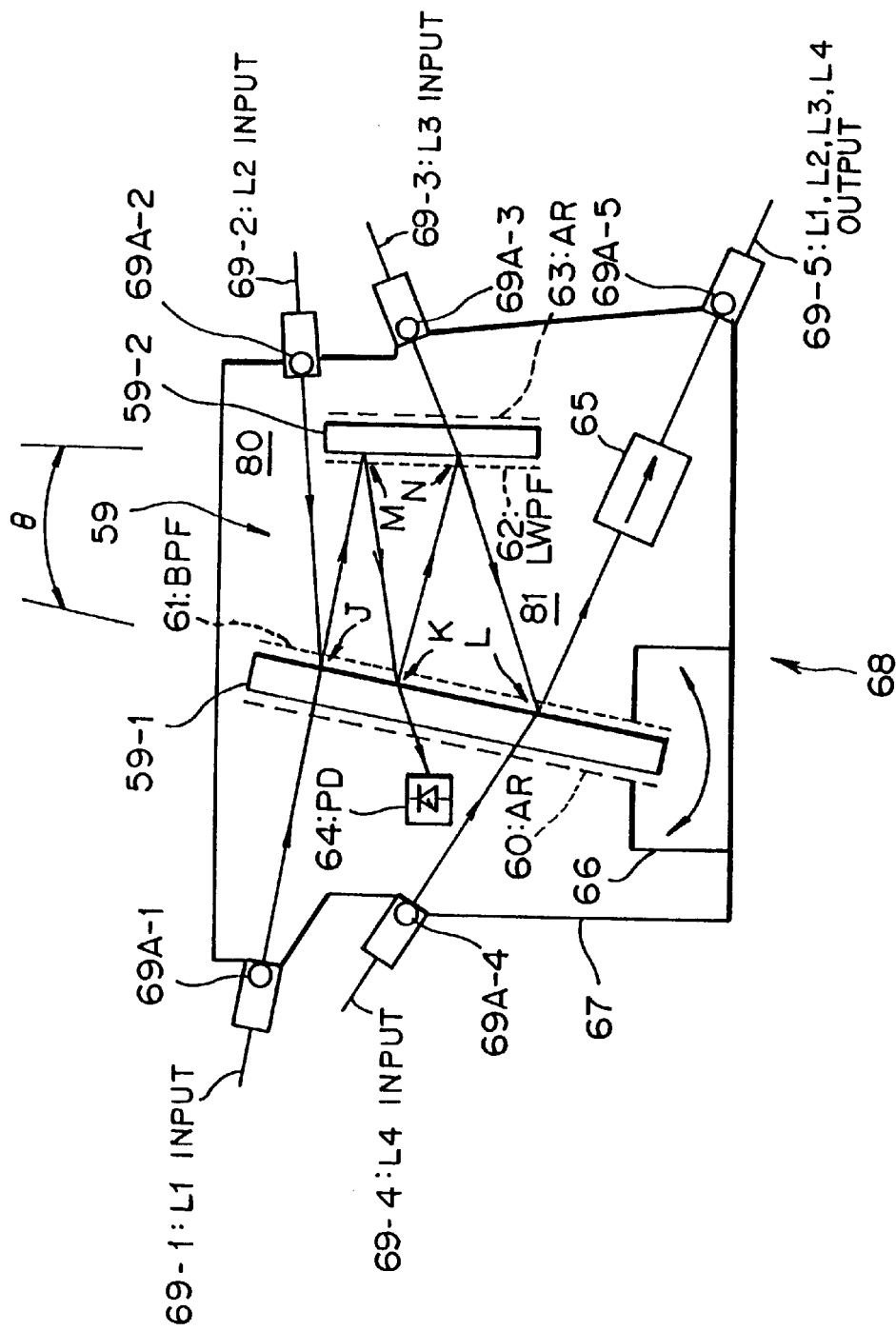
FIG. 19 is a schematic view of an optical module showing a fifth preferred embodiment of the present invention.

Referring now to FIG. 19, the optical module 68 in which the optical device 59 to which the present invention is applied is incorporated includes, in addition to the optical device 59, a photodiode (PD) 64, an isolator (ISO) 65, and a parallel flat plate transparent member tilting mechanism 66. It is to be noted that, while the isolator 65 in the present embodiment is provided on the output side of an optical signal, it may alternatively be provided on the input side of an optical signal similarly as in the other embodiments described hereinabove.

The optical device 59 includes a first parallel flat plate transparent member 59-1 positioned on the input side of an optical signal, and a second parallel flat plate transparent member 59-2 disposed in an opposing relationship to the first parallel flat plate transparent member 59-1 but not in parallel to the first parallel flat plate transparent member 59-1. In order to allow the optical device 59 to have a desired characteristic, the apex angle e defined by the first parallel flat plate transparent member 59-1 and the second parallel flat plate transparent member 59-2 can be set freely.

A non-reflection film 60 is formed on a face of the first parallel flat plate transparent member 59-1 on the input side of an optical signal while a band-pass filter (BPF) film 61 as a dielectric multi-layer film is formed on the other face of the first parallel flat plate transparent member 59-1 on the output side of an input signal. Meanwhile, the second parallel flat plate transparent member 59-2 has a long wavelength-pass filter (LWPF) film 62 as a reflection film formed on a face thereof on the input side of an optical signal for reflecting an optical signal inputted through the first parallel flat plate transparent member 59-1 at least once (two times in FIG. 19) toward the first parallel flat plate transparent member 59-1. The second parallel flat plate transparent member 59-2 further has a non-reflection film 63 formed on the other face thereof on the output side of an optical signal.

An optical signal admission section 80 for introducing, toward a light inputting point of the first parallel flat plate transparent member 59-1, another optical signal is provided at a location spaced away from the second parallel flat plate transparent member 59-2 (in FIG. 19, above the second parallel flat plate transparent member 59-2). Meanwhile, an optical signal extraction section 81 for extracting a reflected optical signal therethrough is provided at a location spaced away from the second parallel flat plate transparent member 59-2 (in FIG. 19, below the second parallel flat plate transparent member 59-2).

The point J on the first parallel flat plate transparent member 59-1 of the optical device 59 is a first incident point of an optical signal to the BPF film 61; the point K a second incident point; and the point L a third incident point. Further, the point M on the second parallel flat plate transparent member 59-2 is a first reflection point of the optical signal on the LWPF film 62; and the point N a second reflection point.

The first parallel flat plate transparent member 59-1 of the optical device 59 is provided on the parallel flat plate transparent member tilting mechanism 66 secured in a package 67, which is made of, for example, stainless steel, by adhesion or metallization soldering. The parallel flat plate transparent member tilting mechanism 66 can tilt the first parallel flat plate transparent member 59-1 to adjust the angle of the optical device 59 with respect to the optical path of an optical signal to adjust the delicate wavelength characteristic of the dielectric multi-layer film. It is to be noted that alternatively the second parallel flat plate transparent member 59-2 may be provided for tilting adjustment on the parallel flat plate transparent member tilting mechanism 66.

The isolator 65 serving as a non-reciprocal portion of an isolator of the non-polarization dependent type prevents resonance of the optical amplifier 74 which will be hereinafter described and has the characteristic of the non-polarization dependency. While the isolator 65 is provided on the output side of an optical signal with respect to the optical device 59, it may alternatively be provided on the input side with respect to the optical device 59.

The photodiode 64 is securely soldered in the package 67 with the optical axis thereof adjusted in position. The photodiode 64 receives an optical signal leaking from the optical device 59 and monitors the output level of the optical signal in order to feed back the monitored output level to an automatic level controller which keeps the output level of the optical signal of the optical amplifier fixed.

All of an optical fiber 69-1 with a lens 69A-1 for inputting an optical signal L1, another optical fiber 69-2 with a lens 69A-2 for inputting another optical signal L2, a further optical fiber 69-3 with a lens 69A-3 for inputting a further optical signal L3, a still further optical fiber 69-4 with a lens 69A-4 for inputting a still further optical signal L4, and a yet further optical fiber 69-5 with a lens 69A-5 for outputting the optical signals L1 to L4 are securely soldered to the package 67 with the optical axes thereof adjusted in position. A collimate lens is used for the lenses 69A-1 to 69A-5, and the collimate lenses 69A-1 to 69A-5 are individually attached to optical fibers to construct the optical fibers 69-1 to 69-5 with a lens which have an improved light collection property for an optical signal. However, the optical fibers 69-1 to 69-4 with a lens for inputting an optical signal may each be constructed as a polarization plane keeping fiber. In this instance, the first parallel flat plate transparent member 59-1 and the second parallel flat plate transparent member 59-2 may be formed from a double refraction material, and a suitable medium which can keep a polarization plane (for example, a tapered prism made of a double refraction material, a polarization plane keeping fiber or the like) may be interposed between the first parallel flat plate transparent member 59-1 and the second parallel flat plate transparent member 59-2.

Referring to FIGS. 19 and 20, in the optical amplifier 74 having the construction described above, an optical signal amplified by the erbium doped fiber 73 is first inputted as the optical signal L1 through the optical fiber 69-1 with a lens to the first parallel flat plate transparent member 59-1 of the optical device 59 of the optical module 68 together with spontaneous emission light generated in the erbium doped fiber 73 and remaining pump light which has not been used effectively as pump light. In this instance, in order to prevent returning reflection light from the first parallel flat plate transparent member 59-1, the optical signal is inputted by 0.5 degrees above a normal line to the first parallel flat plate transparent member 59-1 of the optical device 59.

Here, also the wavelength characteristic of the dielectric multi-layer films when the incident angle varies, which is caused by multiple reflection of an optical signal, exhibits similar variations to those described hereinabove with reference to FIGS. 15 and 16.

Also with the optical device 59, since the first parallel flat plate transparent member 59-1 and the second parallel flat plate transparent member 59-2 opposing to each other do not extend in parallel to each other, when an inputted optical signal is multiple reflected by and between the first parallel flat plate transparent member 59-1 and the second parallel flat plate transparent member 59-2, it exhibits several different incident angles similarly as in the optical devices described hereinabove in connection with the first to fourth embodiments.

While the optical device 59 employs the BPF film 61 as the dielectric multi-layer film formed on the first parallel flat plate transparent member 59-1 and employs the LWPF film 62 as the dielectric multi-layer film formed on the second parallel flat plate transparent member 59-2, since the BPF film 61 and the LWPF film 62 have a wavelength characteristic which shifts to the short wavelength side as the incident angle of the input signal increases, the dielectric multi-layer films of the BPF film 61 and the LWPF film 62 have different wavelength characteristics as the incident angle of the input signal varies similarly to those shown in FIGS. 15 and 16, respectively.

The optical signal L1 inputted to the point J of the first parallel flat plate transparent member 59-1 of the optical device 59 is reflected for the first time at the point M of the second parallel flat plate transparent member 59-2 and then inputted for the second time to the point K of the second parallel flat plate transparent member 59-2. Then, the optical signal is reflected for the second time at the point N of the second parallel flat plate transparent member 59-2 and then inputted for the third time to the point L of the first parallel flat plate transparent member 59-1.

Simultaneously, the optical signal L2 is inputted through the optical signal admission section 80 located adjacent the second parallel flat plate transparent member 59-2 to the point J of the first parallel flat plate transparent member 59-1; the optical signal L3 is inputted through the point N of the second parallel flat plate transparent member 59-2 to the point L of the first parallel flat plate transparent member 59-1; and the optical signal L4 is inputted through the point L of the second parallel flat plate transparent member 59-2.

In this instance, when the optical signals L1 and L2 are inputted for the first time to the point J of the BPF film 61 formed on the first parallel flat plate transparent member 59-1, the optical signal L1 having the wavelength of 1.55 $\mu$m passes at the point J while spontaneous emission light of the wavelength of 1.51 to 1.54 $\mu$m and pump light of the wavelength of 1.48 $\mu$m are intercepted. Further, the optical signal L2 of the wavelength of 1.565 $\mu$m is reflected at the point J. Consequently, the optical signals L1 and L2 are multiplexed with each other. In other words, the optical device 59 functions, at the point J of the BPF film 61, as a band-pass filter (BPF) and also as an optical wave multiplexer (WDM). It is to be noted that the band-pass filter (BPF) and the optical wave multiplexer (WDM) are equivalent to the member denoted by the reference character BPF/WDM in FIG. 20.

Then, the multiplexed optical signal of the optical signals L1 and L2 is reflected at the point M of the LWPF film 62 formed on the second parallel flat plate transparent member 59-2 and inputted to the point K of the BPF film 61 of the first parallel flat plate transparent member 59-1. At the point K of the BPF film 61 of the first parallel flat plate transparent member 59-1, approximately 10 percent of the optical signal L1 of the wavelength of 1.55 $\mu$m passes while the remaining approximately 90 percent of the light signal L1 and the optical signal L2 are reflected since the wavelength characteristic of the BPF film 61 of the first parallel flat plate transparent member 59-1 shifts as the input angles of the optical signals vary. It is to be noted that the passing optical signal L1 of approximately 10 percent is inputted to the photodiode 64 and used to be fed back to the automatic level controller (ALC circuit) for keeping the output level of the optical signal of the optical amplifier to a fixed level. In other words, the optical device 59 functions, at the point K of the BPF film 61, as a coupler (CPL). It is to be noted that the coupler (CPL) is equivalent to the member denoted by the reference character CPL in FIG. 20.

Further, at the point N of the LWPF film 62 of the second parallel flat plate transparent member 59-2, the multiplexed optical signal of the reflected optical signals L1 and L2 is reflected while the optical signal L3 of the wavelength of 1.58 $\mu$m passes. Consequently, the optical signals L1 to L3 are multiplexed. In other words, the optical device 59 functions, at the point N of the LWPF film 62, a long wavelength-pass filter (LWPF) as well as an optical wave multiplexer (WDM). It is to be noted that the long wavelength-pass filter (LWPF) and the optical wave multiplexer (WDM) are equivalent to the member denoted by the reference character LWPF/WDM in FIG. 20.

Furthermore, at the point L of the BPF film 61 of the first parallel flat plate transparent member 59-1, the optical signal L4 of the wavelength of 1.515 $\mu$m passes while the multiplexed optical signal of the optical signals L1 to L3 is reflected. Consequently, the optical signals L1 to L4 inputted to the optical device 59 are multiplexed. In other words, the optical device 59 functions, at the point L of the BPF film 61, an optical wave multiplexer (WDM). It is to be noted that the optical wave multiplexer (WDM) is equivalent to the member denoted by the reference character WDM in FIG. 20.

Finally, the multiplexed optical signal is outputted through the optical signal extraction section 81 provided below the second parallel flat plate transparent member 59-2 of the optical device 59 and sent out to a transmission line from the optical fiber 69-5 with the lens 69A-5 through the isolator 65.

Thus, it can be seen that the optical device 59 integrally includes the band-pass filter and optical wave multiplexer (BPF/WDM), the coupler (CPL), the long wavelength-pass filter and optical wave multiplexer (LWPF/WDM) and the optical wave multiplexer (WDM) of the rear circuit shown in FIG. 20.

Subsequently, operation of the optical amplifier 74 wherein the optical module 68 including the optical device 59 to which the present invention is applied is applied to the rear circuit of the optical amplifier 74 which employs an erbium-doped optical fiber as seen in FIG. 20 will be described.

First, an optical signal multiplexed by the WDM coupler 70 and pump light generated by the laser diode 71 are inputted to the erbium doped fiber 73, in which the optical signal is amplified with the energy of the pump light.

Then, the thus amplified optical signal is inputted from the optical fiber 69-1 with a lens to the optical module 68 serving as the rear circuit of the optical amplifier 74 together with spontaneous emission light (ASE) generated in the erbium doped fiber 73 and remaining pump light which has not been used effectively as pump light.

The optical signal inputted to the optical module 68 is introduced into the optical device 59 via the first parallel flat plate transparent member 59-1. Then, in the optical device 59, the optical signal is multiple reflected by and between the first parallel flat plate transparent member 59-1 and the second parallel flat plate transparent member 59-2. In this instance, the optical device 59 functions as a band-pass filter for removing the spontaneous emission light generated in the erbium doped fiber 73 and the remaining pump light which has not been used effectively as pump light, a coupler for extracting monitor light and an optical wave multiplexer for multiplexing the optical signal and a plurality of optical signals inputted to the optical device 59. Then, the optical signal is outputted from the optical signal extraction section 81 to the optical fiber 69-5 with a lens.

In this manner, the optical device optical device 59 according to the present embodiment has such a simple construction that the first parallel flat plate transparent member 59-1 and the second parallel flat plate transparent member 59-2 opposing to each other do not extend in parallel to each other and the band-pass filter film 61 as a dielectric multi-layer film is formed on the first parallel flat plate transparent member 59-1 while the long wavelength-pass film 62 as a reflection film is formed on the second parallel flat plate transparent member 59-2 and the optical signal extraction section 81 is provided on the second parallel flat plate transparent member 59-2. Consequently, the optical device 59 can provide, to the optical module 68 which is constructed employing the optical device 59, the four functions of an isolator which prevents resonance of the amplifier and has no polarization dependency, a band-pass filter which intercepts pump light and spontaneous emission light, a coupler and photodiode for monitoring the level of an output optical signal, and an optical wave multiplexer for multiplexing a plurality of optical signals. The optical module 68 can be applied also to a wavelength multiplexing communication system in optical communication.

Consequently, operations which are usually performed by a plurality of optical films can be realized using two dielectric multi-layer films. Accordingly, the cost for such optical films can be reduced, and the optical device can be produced with a comparatively small size and at a comparatively low cost.

It is to be noted, while the BPF film 61 is employed as the dielectric multi-layer film formed on the first parallel flat plate transparent member 59-1 of the optical device 59 to which the present invention is applied, the dielectric multi-layer film is not limited to the specific band-pass filter film, and a long wavelength-pass filter film, a short wavelength-pass filter film, a band-block filter film or a branching film may alternatively be employed for the dielectric multi-layer film.

Further, while the long wavelength-pass filter film 62 is employed as the reflection film formed on the second parallel flat plate transparent member 59-2 of the optical device 59, the reflection film is not limited to the specific film, and a total reflection film (for example, a metal film), a band-pass filter film, a short wavelength-pass filter film or a band-block filter film may alternatively be employed for the reflection film.

Also in those cases, operations which are usually performed by a plurality of optical films can be realized only using two dielectric multi-layer films. Accordingly, the cost for such optical films can be reduced, and the optical device can be produced with a comparatively small size and at a comparatively low cost.

Further, in the optical device 59 of the present embodiment, the optical signal admission section 80 for introducing, toward the optical input point of the first parallel flat plate transparent member 59-1, another optical signal is provided at a location spaced away from the second parallel flat plate transparent member 59-2, and the optical signal extraction section 81 for extracting a reflected optical signal therethrough is provided at a location spaced away from the second parallel flat plate transparent member 59-2. However, the locations of them are not limited to such specific locations, and as the optical signal admission section 80, a non-reflection film may be formed at a portion of the second parallel flat plate transparent member 59-2. Meanwhile, as the optical signal extraction section 81, another non-reflection film may be formed at another portion of the second parallel flat plate transparent member 59-2.

Also in those cases, the optical device 59 can provide, to the optical module 68 which is constructed employing the optical device 59, the four functions of an isolator which prevents resonance of the amplifier and has no polarization dependency, a band-pass filter which intercepts pump light and spontaneous emission light, a coupler and photodiode for monitoring the level of an output optical signal, and an optical wave multiplexer for multiplexing a plurality of optical signals. The optical module 68 can be applied also to a wavelength multiplexing communication system in optical communication.

g. Sixth Embodiment

Figure 21:
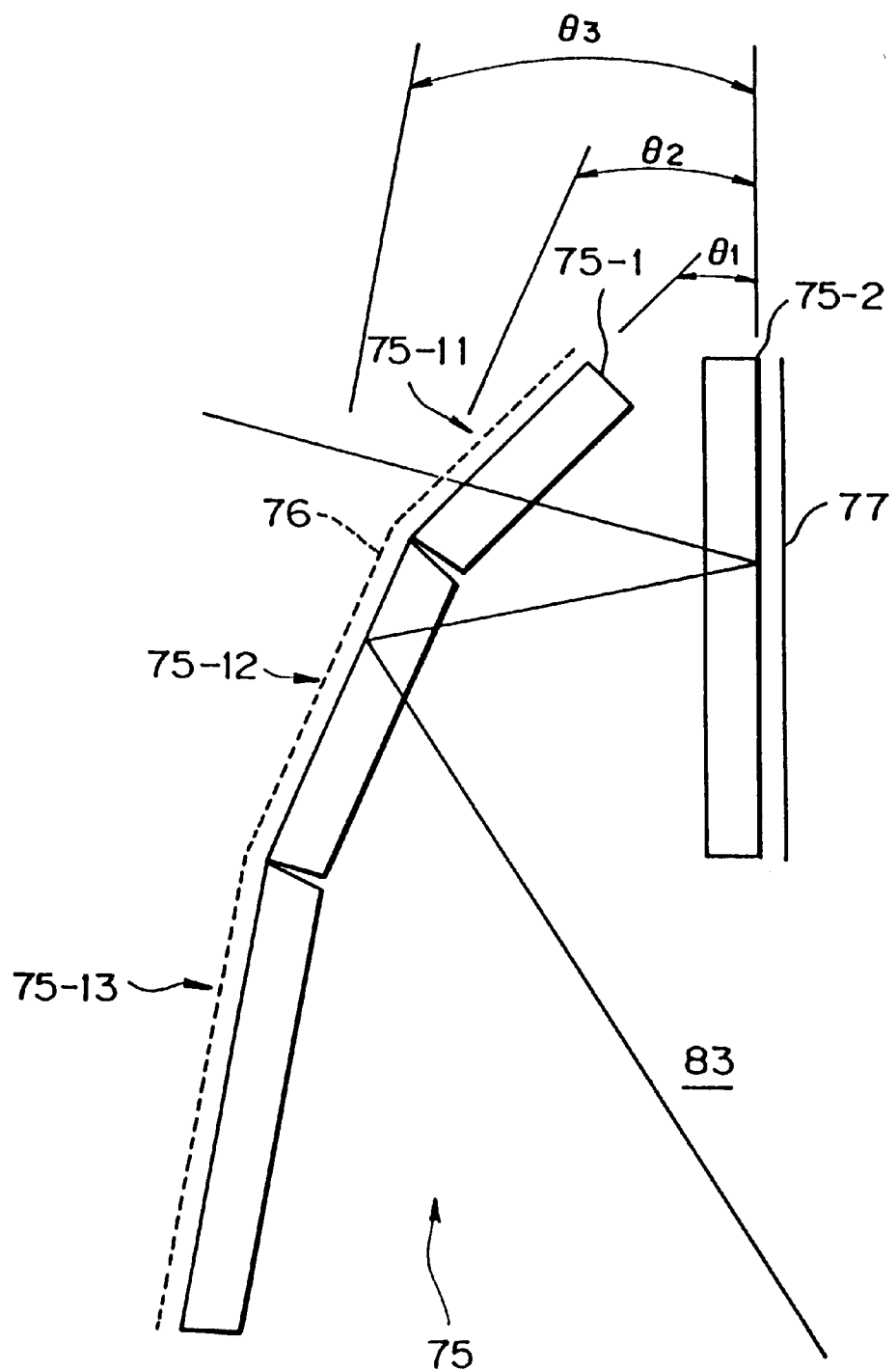
FIG. 21 is a schematic view of a yet further optical device showing a sixth preferred embodiment of the present invention.

Referring now to FIG. 21, there is shown an optical device according to a sixth preferred embodiment of the present invention. The optical device is generally denoted at 75 and includes a first parallel flat plate transparent member 75-1 including a plurality of different parallel flat plate transparent members 75-11 to 75-13 having different inclination angles, and a second parallel flat plate transparent member 75-2 disposed in an opposing relationship to the first parallel flat plate transparent member 75-1 but not in parallel to the first parallel flat plate transparent member 75-1. It is to be noted that the angle (apex angle) defined between the parallel flat plate transparent member 75-11 and the second parallel flat plate transparent member 75-2 is represented by $\theta1$; the angle (apex angle) defined between the parallel flat plate transparent member 75-12 and the second parallel flat plate transparent member 75-2 is represented by $\theta2$; and the angle (apex angle) defined between the parallel flat plate transparent member 75-13 and the second parallel flat plate transparent member 75-2 is represented by $\theta3$.

A dielectric multi-layer film 76 is formed on the first parallel flat plate transparent member 75-1. Meanwhile, the second parallel flat plate transparent member 75-2 has a reflection film 77 formed thereon which reflects an optical signal inputted through the first parallel flat plate transparent member 75-1 at least once (once in FIG. 21) toward the first parallel flat plate transparent member 75-1.

Further, an optical signal extraction section 83 for extracting a reflected optical signal therethrough is provided at a location spaced away from the second parallel flat plate transparent member 75-2 (in FIG. 21, below the second parallel flat plate transparent member 75-2).

Also with the optical device 75 of the present embodiment having the construction described above, operations which are usually performed by a plurality of optical films can be realized only using a single dielectric multi-layer film. Consequently, the cost for such optical films can be reduced, and the optical device can be produced with a comparatively small size and at a comparatively low cost.

h. Seventh Embodiment

Figure 22:
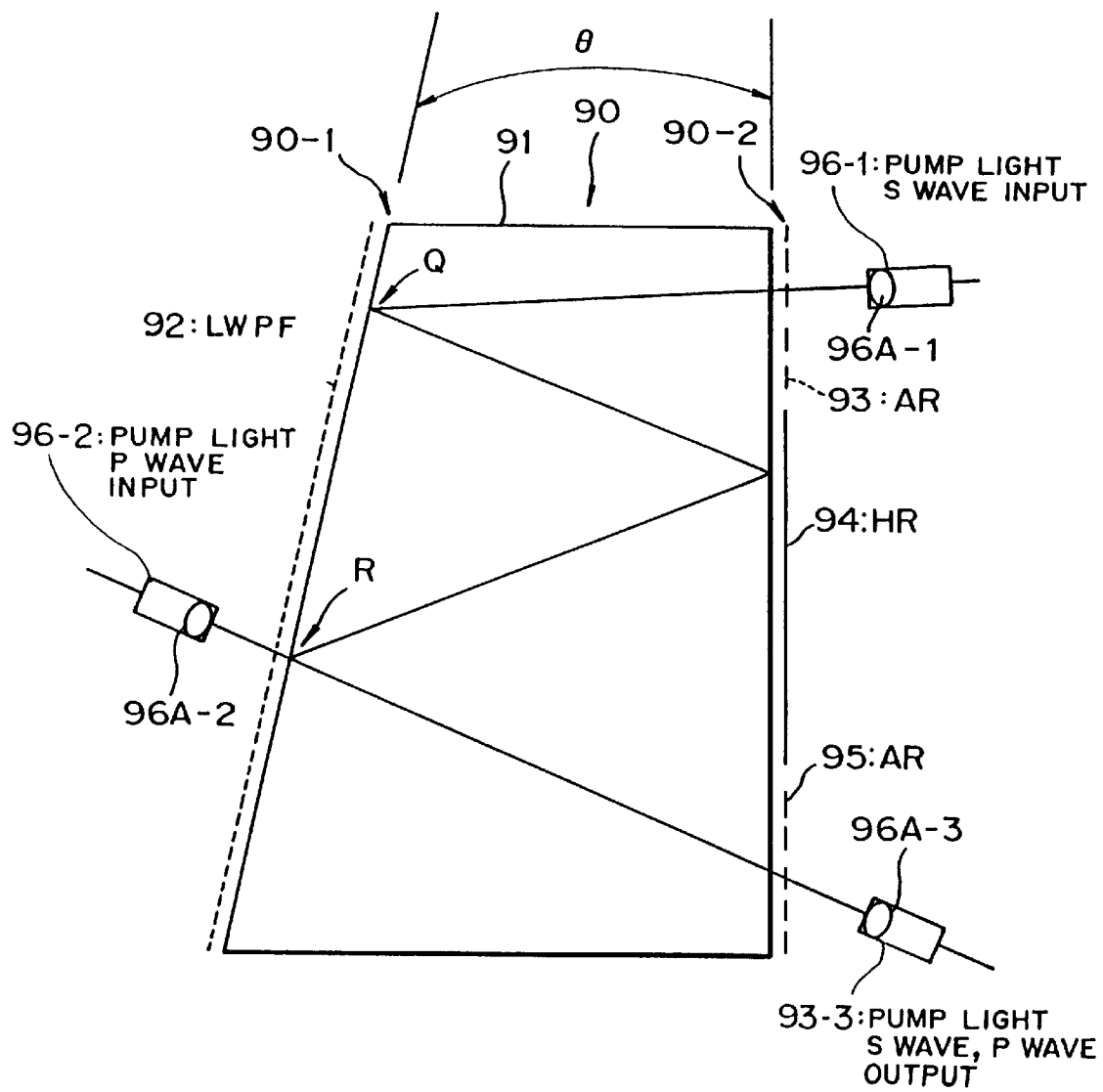
FIG. 22 is a schematic view of a yet further optical device showing a seventh preferred embodiment of the present invention.

Referring now to FIG. 22, there is shown an optical device according to a seventh preferred embodiment of the present invention. The optical device is generally denoted at 90 and includes a tapered prism 91 constructed such that a first face 90-1 and a second face 90-2 thereof opposing to each other do not extend in parallel to each other but define an included angle (apex angle) of θ therebetween.

The second face 90-2 is positioned on the side of the tapered prism 91 from which side an optical signal is inputted. The second face 90-2 has a non-reflection film 93 formed thereon which admits the input optical signal to pass into the tapered prism 91 therethrough. This input optical signal firstly travels from the second face 90-2 toward the first face 90-1; a long wavelength-pass filter (TWPF) film 92 as a dielectric multi-layer film is formed on the first face 90-1. The second face 90-2 further has a total reflection film 94 (for example, a metal film) formed thereon for reflecting an optical signal inputted through the first face 90-1 at least once (once in FIG. 22) toward the first face 90-1. Furthermore, the second face 90-2 has another non-reflection film 95 formed thereon for extracting an optical signal inputted to and reflected in the tapered prism 91.

Further, in the optical device 90 of the present embodiment, the tapered prism 91 is made of a double refraction material, and an optical fiber 96-1 with a lens 96A-1 and another optical fiber 96-2 with a lens 96A-2 for inputting optical signals are each formed from a polarization plane keeping fiber (the optical fibers 96-1 to 96-3 with a lens includes the lenses 96A-1 to 96A-3 to which respective optical fibers are attached). Consequently, high convergence of optical signals is assured, and a particular optical path for particular polarized light is set so that a particular polarized light component of an optical signal can be transmitted. It is to be noted that, though not shown, a non-reciprocal portion of a non-polarization dependent isolator, which is essential as a component of a device for an optical amplifier, may be provided on the input side or the output side of an optical signal.

The point Q of the optical device 90 is a first input point of an optical signal to the LWPF film 92, and the point R is a second input point.

In the optical device 90 of the present embodiment, an S wave and a P wave which are polarized light components of pump light are used as optical signals. The S wave is inputted from the optical fiber 96-1 with a lens to the point Q of the first face 90-1 through the non-reflection film 93 of the second face 90-2 while the P wave is inputted from the optical fiber 96-2 with a lens to the point R of the first face 90-1.

Figure 23:
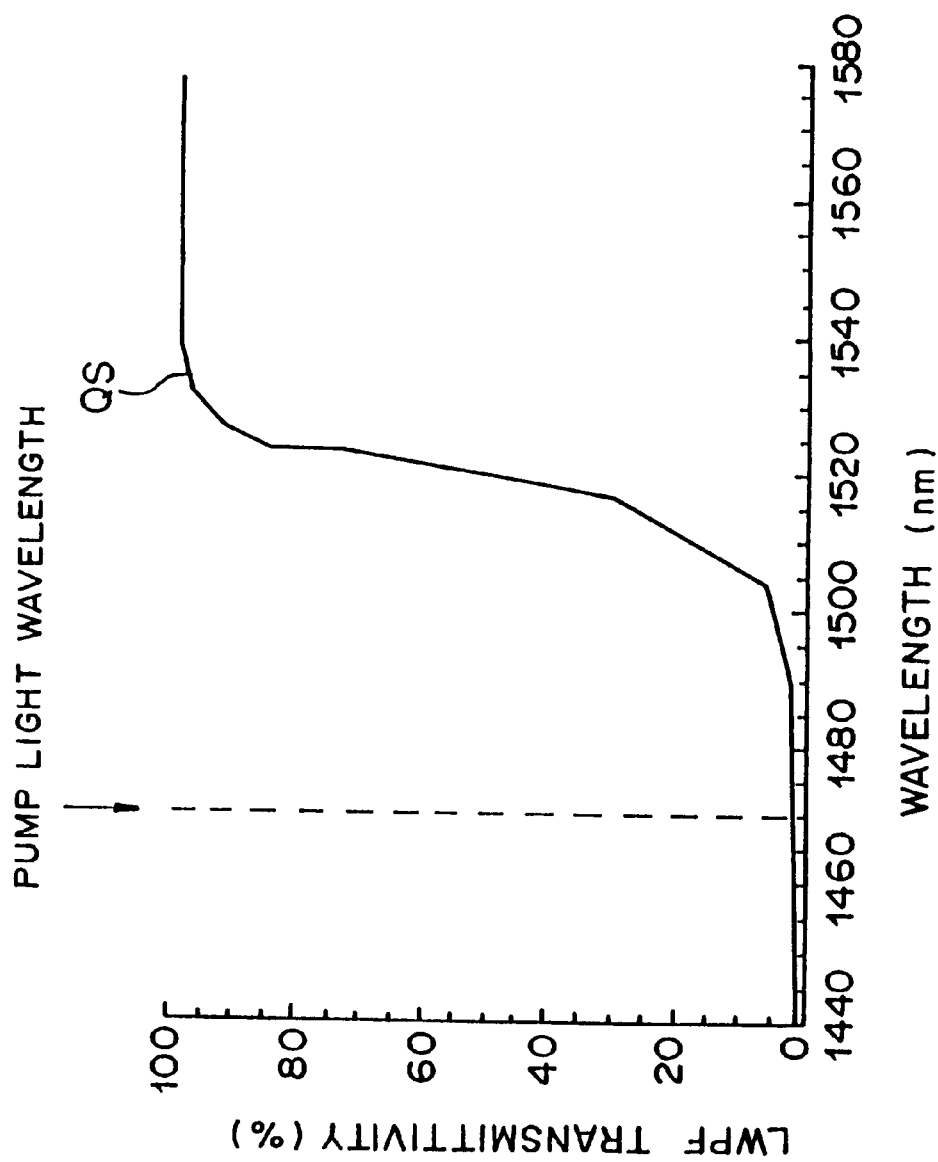
FIGS. 23 and 24 are diagrams illustrating different wavelength characteristics of a long wavelength-pass filter as a dielectric multi-layer film.
Figure 24:
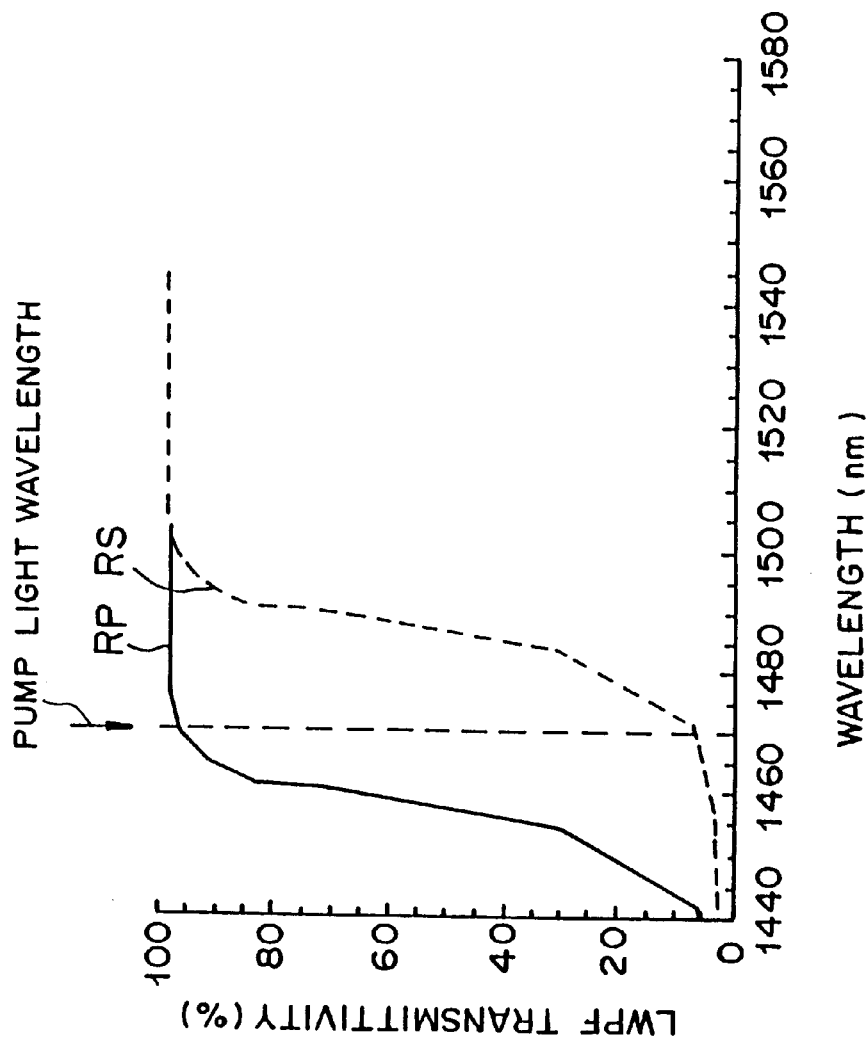
Figure 25:
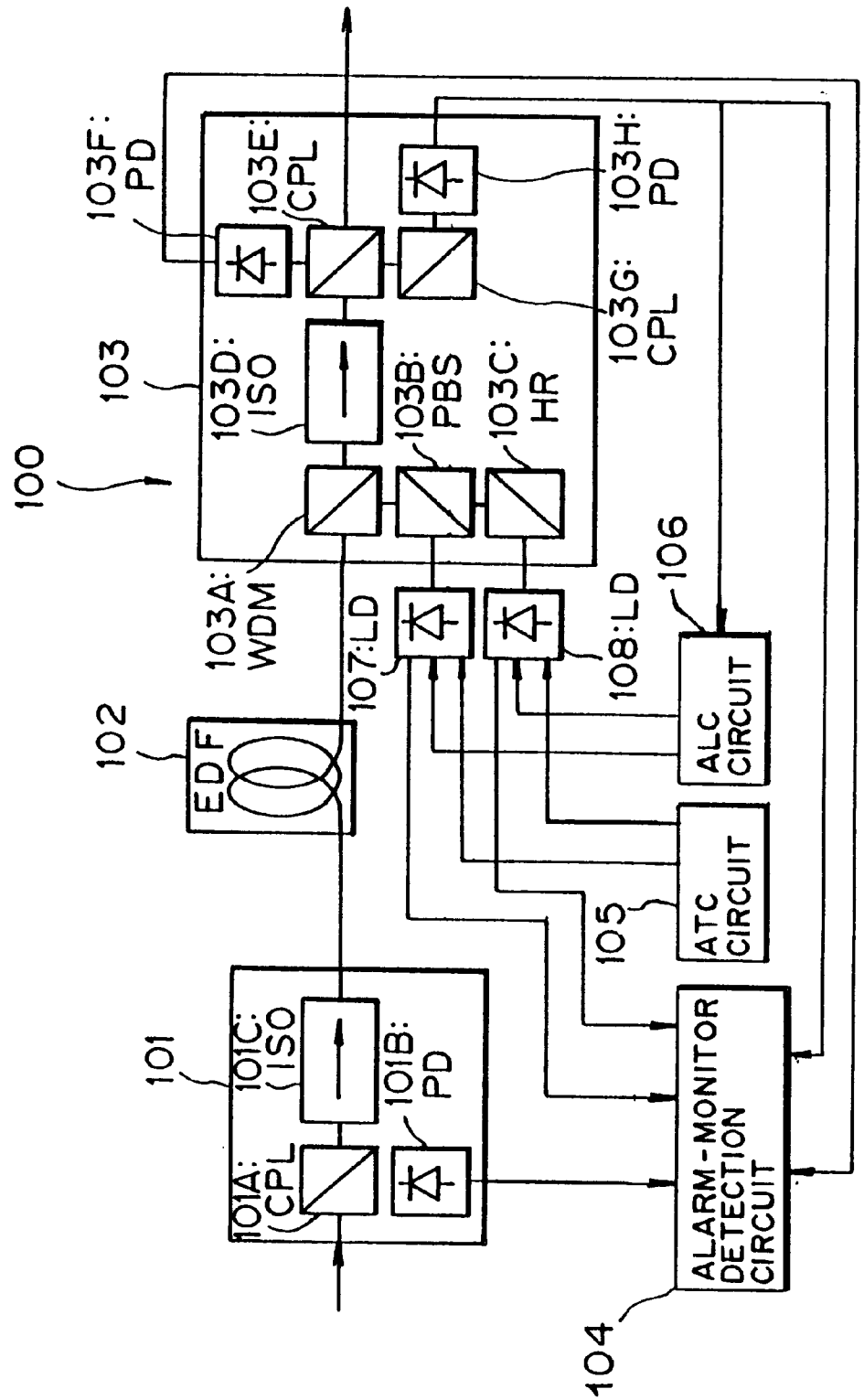
FIG. 25 is a block diagram showing a construction of a common erbium-doped optical fiber amplifier.
Figure 26:
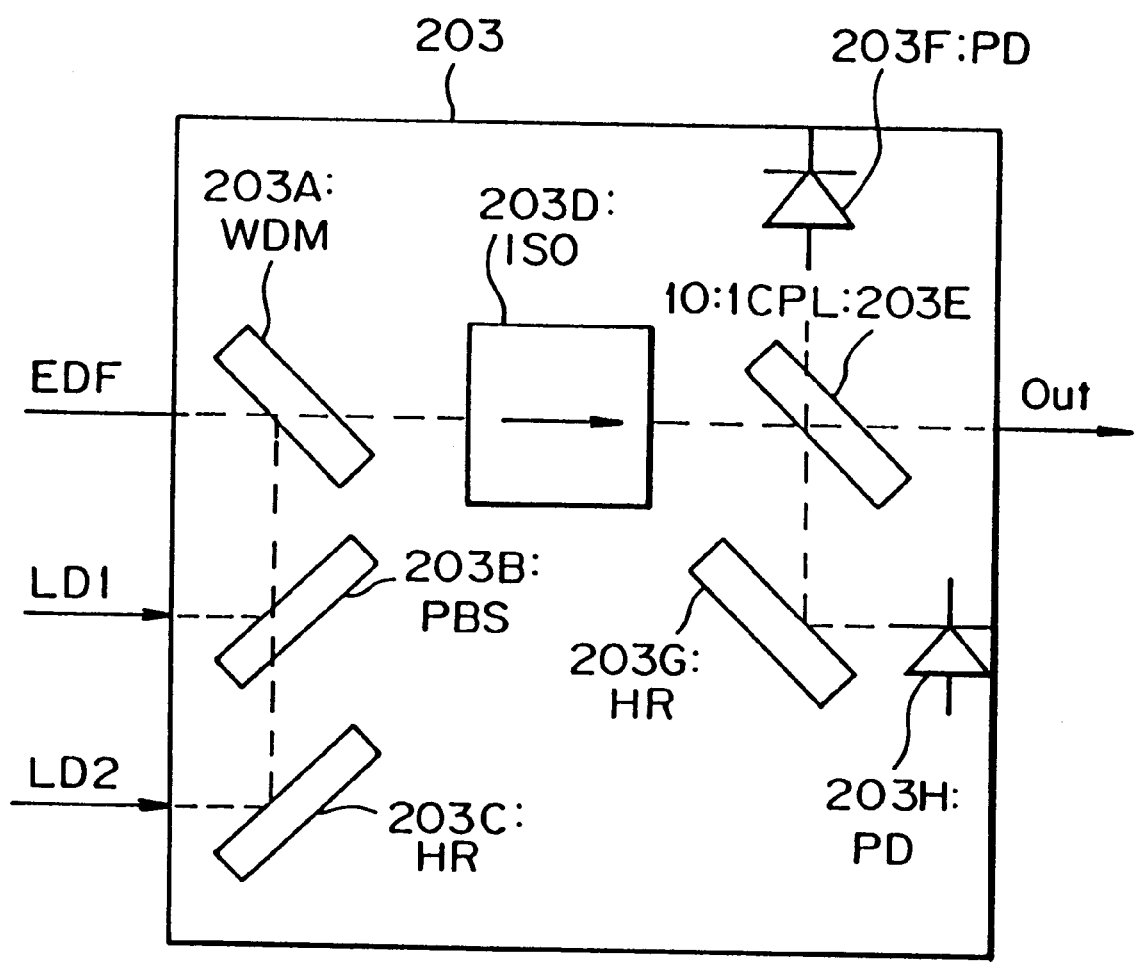
FIG. 26 is a block diagram showing a construction of a rear optical circuit of an erbium-doped optical fiber amplifier.

The waveform characteristics of the LWPF film 92 when an S wave and a P wave, which are polarized light components of pump light, are inputted to the first face 90-1 of the optical device 90 are illustrated in FIGS. 23 and 24, respectively. The curve QS shown in FIG. 23 and the curves RS and RP shown in FIG. 24 illustrate the relationships between the wavelength of the S or P wave and the transmission rate when the S wave is inputted for the first time to the point Q shown in FIG. 22, when the S wave is inputted for the second time to the point R and when the P wave is inputted for the first time to the point R, respectively.

In this instance, in the LWPF film 92 formed on the first face 90-1 of the optical device 90, when the S wave is inputted for the first time, the S wave of the wavelength of 1.47 $\mu$m is reflected at the point Q.

Then, when the S wave is inputted for the second time, since the incident angle is different, the wavelength characteristic of the LWPF film 92 shifts at the point R similarly as in the embodiments described above. However, since the LWPF film 92 has such a characteristic that the shift amount of the wavelength characteristic thereof is different for the S wave and the P wave as seen in FIG. 24, at the point R, the S wave of the wavelength of 1.47 $\mu$m is reflected while the P wave of the same wavelength of 1.47 $\mu$m passes. Consequently, the S wave and the P wave can be polarization coupled. In other words, the optical device 90 functions, at the point R of the LWPF film 92, as a polarization coupler.

Finally, the polarization coupled pump light is outputted through the non-reflection film 95 of the second face 90-2 of the optical device 90 and sent out into a transmission line from the optical fiber 96-3 with a lens.

In this manner, the optical device 90 according to the present embodiment has such a simple construction that it includes the tapered prism 91 constructed such that the first face 90-1 and the second face 90-2 opposing to each other do not extend in parallel to each other and the long wavelength-pass filter film 92 as a dielectric multi-layer film is formed on the first face 90-1 while the second face 90-2 has formed thereon the non-reflection film 93 for admitting another optical signal toward the optical input point of the first face 90-1, the total reflection film 94 serving as a reflection film for reflecting an optical signal inputted through the first face 90-1 at least once toward the first face 90-1, and the non-reflection film 95 for extracting an optical signal inputted to and reflected in the tapered prism 91. Consequently, the optical device 90 can be applied to a polarization coupler for coupling polarized components of an optical signal.

Further, while the optical device 90 in the present embodiment employs the long wavelength-pass filter film 92 as a dielectric multi-layer film formed on the first face 90-1, the dielectric multi-layer film is not limited to the specific long wavelength-pass filter film, and a band-pass filter film, a short wavelength-pass filter film or a band-block filter film may alternatively be employed for the dielectric multi-layer film.

Further, while the total reflection film 94 (for example, a metal film) is employed as the reflection film formed on the second face 90-2 of the optical device 90, the reflection film is not limited to the specific total reflection film, and a band-pass filter film, a long wavelength-pass filter film, a short wavelength-pass filter film or a band-block filter film may alternatively be employed for the reflection film.

Further, while the optical device 90 of the present embodiment includes the tapered prism 91 constructed such that the first face 90-1 and the second face 90-2 opposing to each other do not extend in parallel to each other, the optical device is not limited to the specific one described above. In particular, the optical device may be constructed in any manner only if a first parallel flat plate transparent member and a second parallel flat plate transparent member which oppose to each other do not extend in parallel to each other.

The present invention is not limited to the specifically described embodiment, and variations and modifications may be made without departing from the scope of the present invention.

What is claimed is:

1. An optical device, comprising:
   a tapered prism constructed such that a first face and a second face thereof opposing to each other do not extend in parallel to each other;
   a dielectric multi-layer film formed on said first face of said tapered prism to which an optical signal is inputted;
   a reflection film formed on said second face for reflecting the optical signal which is inputted to said tapered prism through said first face a plurality of times toward said first face, said first face and said second face being disposed such that the optical signal is multiply reflected in said tapered prism between said dielectric multi-layer film and said reflection film while an incident angle thereof to said dielectric multi-layer film successively varies; and
   a first non-reflection film formed on said tapered prism at a surface with which a path of the optical signal multiply reflected in said tapered prism between said dielectric multi-layer film and said reflection film finally intersects and through which the optical signal is to be extracted from said tapered prism.

2. An optical device as claimed in claim 1, wherein said tapered prism is formed from a double refraction material.

3. An optical device as claimed in claim 1, wherein said tapered prism is formed as a polygonal prism of which said first face includes a plurality of different inclined faces.

4. An optical device as claimed in claim 1, wherein said first non-reflection film is disposed perpendicularly to a path along which the optical signal is outputted from said tapered prism.

5. An optical device as claimed in claim 1, further comprising a tapered prism tilting mechanism for tilting the entire tapered prism.

6. An optical device as claimed in claim 1, further comprising an optical fiber with a lens for inputting the optical signal therethrough.

7. An optical device as claimed in claim 6, wherein said optical fiber with a lens for inputting the optical signal therethrough is formed as a polarization plane keeping fiber.

8. An optical device comprising:
   a tapered prism constructed such that a first face and a second face thereof opposing to each other do not extend in parallel to each other;
   a dielectric multi-layer film formed on said first face of said tapered prism which is positioned on a side of said tapered prism to which a first optical signal is inputted;
   a reflection film formed on said second face for reflecting said first optical signal which is inputted to said tapered prism through said first face a plurality of times toward said first face;
   a first non-reflection film formed on one of said first face, said second face and at least one other face of said tapered prism for extracting therethrough said first optical signal inputted to and reflected in said tapered prism; and
   a second non-reflection film formed on a portion of said second face for inputting a second optical signal therethrough to a point of said first face, at which point said first optical signal is inputted to said tapered prism through said first face.

9. An optical device comprising:
   a tapered prism constructed such that a first face and a second face thereof opposing to each other do not extend in parallel to each other;
   a dielectric multi-layer film formed on said first face of said tapered prism which is positioned on a side of said tapered prism to which an optical signal is inputted;
   a reflection film formed on said second face for reflecting the optical signal which is inputted to said tapered prism through said first face a plurality of times toward said first face; and
   a non-reflection film formed on one of said first face, said second face and at least one other face of said tapered prism for extracting the optical signal inputted to and reflected in said tapered prism therethrough,
   wherein said non-reflection film is formed on a portion of said second face.

10. An optical device as claimed in claim 9, wherein said non-reflection film is disposed perpendicularly to a path along which the optical signal is outputted from said tapered prism.

11. An optical device, comprising:
    a tapered prism constructed such that a first face and a second face thereof opposing to each other do not extend in parallel to each other;
    a dielectric multi-layer film formed on said first face of said tapered prism;
    a first non-reflection film formed on a portion of said second face from which an optical signal is to be inputted into said tapered prism through said first non-reflection film toward said first face;
    said dielectric multi-layer film, on said first face, serving to reflect the input optical signal toward said second face;
    a reflection film formed on another portion of said second face for reflecting the optical signal, which has been reflected by said dielectric multi-layer film on the first face, at least one time toward said first face, said reflection film and said dielectric multi-layer film being disposed in such a mutual relationship that the optical signal is reflected, between said first and second faces, at least twice on said dielectric multi-layer film and at least one time on said reflection film while an incident angle of the optical signal with respect to said dielectric multi-layer film successively varies; and
    a second non-reflection film formed on said tapered prism at a surface with which a path of the optical signal multiply reflected in said tapered prism between said dielectric multi-layer film and said reflection film finally intersects and through which the optical signal is to be extracted from said tapered prism.

12. An optical device as claimed in claim 11, wherein said tapered prism is formed from a double refraction material.

13. An optical device as claimed in claim 11, wherein said second non-reflective film for extracting therethrough the optical signal inputted to and reflected in said tapered prism is formed at a portion of said second face.

14. An optical device as claimed in claim 11, further comprising an optical fiber with a lens for inputting the optical signal therethrough.

15. An optical device as claimed in claim 14, wherein said optical fiber with a lens for inputting the optical signal therethrough is formed as a polarization plane keeping fiber.

16. An optical device, comprising:
    a tapered prism constructed such that a first face and a second face thereof opposing to each other do not extend in parallel to each other;
    a dielectric multi-layer film formed on said first face of said tapered prism which is positioned on a side of said tapered prism;

a reflection film formed on said second face for reflecting on optical signal which is inputted to said tapered prism at least one time toward said first face, said first face and said second face being disposed such that the optical signal is multiply reflected in said tapered prism between said dielectric multi-layer film and said reflection film while an incident angle thereof to said dielectric multi-layer film successively varies; and a first non-reflection film formed on said tapered prism at a surface with which a path of the optical signal multiply reflected in said tapered prism between said dielectric multi-layer film and reflection film finally intersects and through which the optical signal is to be extracted from said tapered prism.

* * * * *